US012747513B2

(12) United States Patent
Whitton et al.

(10) Patent No.: US 12,747,513 B2
(45) Date of Patent: Sep. 29, 2026

(54) SYSTEM FOR SECURING COMPONENT FOR AN ELECTRICALLY-DRIVEN PROCESS

(71) Applicant: Chromalloy Gas Turbine LLC, Palm Beach Gardens, FL (US)

(72) Inventors: James Whitton, East Burke, VT (US); Zachary Hopkins, San Diego, CA (US); Zachary Oras, Riverview, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 379 days.

(21) Appl. No.: 18/443,250

(22) Filed: Feb. 15, 2024

(65) Prior Publication Data

US 2024/0191386 A1 Jun. 13, 2024

Related U.S. Application Data

(60) Continuation-in-part of application No. 18/155,187, filed on Jan. 17, 2023, now Pat. No. 11,926,919,
(Continued)

(51) Int. Cl.
*C25D 5/02* (2006.01)
*B33Y 80/00* (2015.01)
(Continued)

(52) U.S. Cl.
CPC ............. *C25D 5/022* (2013.01); *C25D 7/008* (2013.01); *C25D 17/06* (2013.01); *F01D 5/288* (2013.01);
(Continued)

(58) Field of Classification Search
None
See application file for complete search history.

(56) References Cited

U.S. PATENT DOCUMENTS 2,068,302 A 1/1937 Nickol
3,192,844 A 7/1965 Szasz et al.
(Continued)

FOREIGN PATENT DOCUMENTS

CN 102566495 A 7/2012
CN 206701571 U 12/2017
(Continued)

OTHER PUBLICATIONS

Extended European Search Report, dated Sep. 26, 2025, 9 pages, issued in European Patent Application No. 25173584.1.
(Continued)

*Primary Examiner* — Jethro M. Pence
(74) *Attorney, Agent, or Firm* — AVEK IP, LLC

(57) ABSTRACT

A system for securing a component for an electrically-driven process is disclosed. The system includes a mai015134n body having an opening, a retention slot configured for retaining the component, and a channel. The system includes a fastener extending through the opening in the main body, and an insert inserted into the channel. The system has a shank movably coupled to the fastener and configured to contact the insert. The insert is configured to maintain electrical contact between the shank and the component when the component is retained within the retention slot.

20 Claims, 24 Drawing Sheets

Related U.S. Application Data which is a division of application No. 16/897,857, filed on Jun. 10, 2020, now Pat. No. 11,629,424.

(51) Int. Cl.

| | |
|---|---|
| ***C25D 7/00*** | (2006.01) |
| ***C25D 17/06*** | (2006.01) |
| ***F01D 5/28*** | (2006.01) |

(52) U.S. Cl.

CPC ........... *B33Y 80/00* (2014.12); *F05D 2230/90* (2013.01); *F05D 2260/30* (2013.01)

(56) References Cited

U.S. PATENT DOCUMENTS

| | | | | |
|---|---|---|---|---|
| 3,709,163 | A | 1/1973 | Smedley et al. | |
| 3,871,611 | A | 3/1975 | Taketa | |
| 4,288,313 | A | 9/1981 | Bormke et al. | |
| 4,321,010 | A | 3/1982 | Wilkinson et al. | |
| 4,480,956 | A | 11/1984 | Kruger et al. | |
| 4,829,720 | A * | 5/1989 | Cavalieri | B24B 19/14 451/365 |
| 5,527,435 | A | 6/1996 | Arnau | |
| 5,846,036 | A | 12/1998 | Mizoguchi | |
| 6,139,303 | A * | 10/2000 | Reed | B23K 26/18 425/127 |
| 6,273,676 | B1 | 8/2001 | Brooks et al. | |
| 6,403,157 | B2 | 6/2002 | Ireland et al. | |
| 6,782,940 | B2 | 8/2004 | Billiet et al. | |
| 7,066,799 | B2 | 6/2006 | Oussaada et al. | |
| 7,413,001 | B2 | 8/2008 | Wang et al. | |
| 7,632,541 | B2 | 12/2009 | Saylor et al. | |
| 7,854,830 | B2 | 12/2010 | Rao et al. | |
| 8,720,369 | B2 | 5/2014 | Rayman et al. | |
| 8,807,931 | B2 | 8/2014 | Roberts | |
| 9,089,999 | B2 | 7/2015 | Dean | |
| 9,249,490 | B2 * | 2/2016 | Trzcinski | C23C 4/01 |
| 9,476,439 | B1 | 10/2016 | Liao | |
| 9,506,350 | B1 | 11/2016 | Memmen | |
| 9,506,357 | B1 | 11/2016 | Bassett | |
| 9,718,255 | B2 * | 8/2017 | Berger | B32B 15/01 |
| 9,782,829 | B2 * | 10/2017 | Morris | B22F 5/10 |
| 9,844,897 | B2 | 12/2017 | Lowth et al. | |
| 9,845,694 | B2 | 12/2017 | Hagan et al. | |
| 9,938,857 | B2 * | 4/2018 | Mayer | F01D 25/243 |
| 10,060,277 | B2 * | 8/2018 | Engel | F01D 5/3084 |
| 10,113,225 | B2 * | 10/2018 | Murphy | C23C 10/32 |
| 10,570,753 | B2 * | 2/2020 | Trzcinski | B05C 21/005 |
| 10,598,030 | B2 * | 3/2020 | Kottilingam | C21D 9/0068 |
| 10,689,991 | B2 * | 6/2020 | Engel | F01D 5/3084 |
| 10,767,503 | B2 * | 9/2020 | Barainca | F02K 3/06 |
| 10,883,386 | B2 * | 1/2021 | Chartier | F01D 25/285 |
| 10,982,859 | B2 * | 4/2021 | Folkers | F23R 3/46 |
| 11,048,829 | B2 | 6/2021 | Stump | |
| 11,629,424 | B2 | 4/2023 | Whitton et al. | |
| 11,702,732 | B2 | 7/2023 | Jorzik | |
| 11,806,894 | B2 | 11/2023 | Dodds et al. | |
| 11,926,919 | B2 | 3/2024 | Whitton et al. | |
| 12,070,763 | B2 | 8/2024 | Turner | |
| 12,103,197 | B2 | 10/2024 | Dodds et al. | |
| 2001/0008323 | A1 | 7/2001 | Reed et al. | |
| 2002/0187065 | A1 | 12/2002 | Amaya et al. | |
| 2003/0024825 | A1 | 2/2003 | Lamphere et al. | |
| 2004/0247946 | A1 | 12/2004 | Seitz | |
| 2005/0205644 | A1 | 9/2005 | Meier | |
| 2005/0227589 | A1 | 10/2005 | Oussaada et al. | |
| 2006/0021579 | A1 | 2/2006 | Bernaski et al. | |
| 2006/0085979 | A1 | 4/2006 | Bayer et al. | |
| 2007/0039178 | A1 | 2/2007 | Bladon et al. | |
| 2011/0239934 | A1 | 10/2011 | Soucy et al. | |
| 2012/0073353 | A1 | 3/2012 | McNally | |
| 2012/0100299 | A1 | 4/2012 | Zajchowski et al. | |
| 2012/0104042 | A1 | 5/2012 | Tirone et al. | |
| 2012/0132138 | A1 | 5/2012 | Beaudoin et al. | |
| 2012/0291983 | A1 | 11/2012 | Graham et al. | |
| 2013/0174923 | A1 | 7/2013 | Bellino et al. | |
| 2013/0220571 | A1 | 8/2013 | Mueller et al. | |
| 2014/0165376 | A1 * | 6/2014 | Soucy | B05B 12/20 29/559 |
| 2014/0190834 | A1 * | 7/2014 | Calla | C25D 5/022 427/430.1 |
| 2014/0242278 | A1 | 8/2014 | Hlavaty et al. | |
| 2015/0096713 | A1 | 4/2015 | Marcin | |
| 2015/0338005 | A1 * | 11/2015 | Davis | F16L 21/02 285/305 |
| 2016/0047276 | A1 * | 2/2016 | Mayer | F01D 25/243 415/214.1 |
| 2016/0201484 | A1 * | 7/2016 | Engel | F01D 5/284 29/889.21 |
| 2016/0333706 | A1 | 11/2016 | Uihlein et al. | |
| 2017/0197359 | A1 | 7/2017 | Yang et al. | |
| 2017/0267328 | A1 | 9/2017 | Plickys | |
| 2017/0284419 | A1 | 10/2017 | Bishop et al. | |
| 2018/0209279 | A1 | 7/2018 | Trzcinski et al. | |
| 2018/0281006 | A1 | 10/2018 | Coskun et al. | |
| 2018/0333824 | A1 | 11/2018 | Strzyzewski et al. | |
| 2018/0347370 | A1 | 12/2018 | Lacy et al. | |
| 2019/0015893 | A1 | 1/2019 | Breneman et al. | |
| 2019/0264746 | A1 | 8/2019 | Adams et al. | |
| 2019/0329488 | A1 | 10/2019 | Ravich et al. | |
| 2020/0056484 | A1 | 2/2020 | Breen | |
| 2020/0354804 | A1 | 11/2020 | Welch et al. | |
| 2021/0269659 | A1 | 9/2021 | Nguyen et al. | |
| 2021/0276077 | A1 | 9/2021 | Hearon et al. | |
| 2021/0324194 | A1 | 10/2021 | Thiria et al. | |
| 2021/0348513 | A1 | 11/2021 | Jones et al. | |
| 2021/0348514 | A1 | 11/2021 | Snider et al. | |
| 2021/0388522 | A1 | 12/2021 | Whitton et al. | |
| 2022/0010684 | A1 | 1/2022 | Baldwin et al. | |
| 2022/0146043 | A1 | 5/2022 | Depalma et al. | |
| 2022/0162745 | A1 | 5/2022 | Jorzik | |
| 2022/0184656 | A1 | 6/2022 | Turner | |
| 2022/0186381 | A1 | 6/2022 | Shuck et al. | |
| 2023/0183878 | A1 | 6/2023 | Whitton et al. | |
| 2023/0347434 | A1 * | 11/2023 | Garner | B23H 9/10 |
| 2023/0415375 | A1 | 12/2023 | Dodds et al. | |
| 2024/0191386 | A1 | 6/2024 | Whitton et al. | |
| 2024/0426019 | A1 | 12/2024 | Hopkins | |
| 2025/0108482 | A1 | 4/2025 | Hopkins et al. | |
| 2025/0129725 | A1 | 4/2025 | Oras et al. | |
| 2025/0178025 | A1 | 6/2025 | Oras et al. | |
| 2025/0179681 | A1 | 6/2025 | Hopkins et al. | |
| 2025/0235984 | A1 | 7/2025 | Oras et al. | |
| 2025/0249549 | A1 | 8/2025 | Oras et al. | |
| 2025/0262640 | A1 | 8/2025 | Hopkins et al. | |
| 2025/0354245 | A1 | 11/2025 | van den Bosch et al. | |

FOREIGN PATENT DOCUMENTS

| | | | |
|---|---|---|---|
| CN | 108819049 | A | 11/2018 |
| CN | 114737243 | A | 7/2022 |
| CN | 119159100 | A | 12/2024 |
| CN | 120099609 | A | 6/2025 |
| CN | 120100533 | A | 6/2025 |
| CN | 120961334 | A | 11/2025 |
| EP | 0925845 | A2 | 6/1999 |
| EP | 3351652 | A1 | 7/2018 |
| EP | 4488426 | A1 | 1/2025 |
| EP | 4530018 | A1 | 4/2025 |
| EP | 4566722 | A1 | 6/2025 |
| EP | 4567163 | A1 | 6/2025 |
| EP | 4650056 | A1 | 11/2025 |
| ES | 2732867 | T3 | 11/2019 |
| KR | 200353432 | Y1 | 6/2004 |
| WO | 2019132912 | A1 | 7/2019 |
| WO | 2025170729 | A1 | 8/2025 |

OTHER PUBLICATIONS

International Search Report and Written Opinion, dated Mar. 19, 2025, 9 pages, issued in International Patent Application No. PCT/US2025/011789.

(56) References Cited

OTHER PUBLICATIONS

Notice of Allowance, dated Jul. 8, 2025, 5 pages, issued in U.S. Appl. No. 18/491,574.
Extended European Search Report, dated Apr. 22, 2025, 7 pages, issued in EP Patent Application No. 24217868.9.
Extended European Search Report, dated Apr. 30, 2025, 9 pages, issued in European Patent Application No. 24217895.2.
Extended European Search Report, dated Dec. 11, 2024, 9 pages, issued in EP Patent Application No. 24170432.9.
Extended European Search Report, dated Feb. 20, 2025, 7 pages, issued in European Application No. 24203188.8.
Extended European Search Report, dated Nov. 6, 2024, issued in European Application No. 23214046.7.
Lin et al., Original & Machine Translation, CN 105081811 A (Year: 2015).

* cited by examiner

SYSTEM FOR SECURING COMPONENT FOR AN ELECTRICALLY-DRIVEN PROCESS

CROSS-REFERENCE TO RELATED APPLICATIONS

This application is a continuation-in-part of U.S. patent application Ser. No. 18/155,187, filed Jan. 17, 2023, which is a divisional of U.S. patent application Ser. No. 16/897,857, filed Jun. 10, 2020, now U.S. Pat. No. 11,629,424. The disclosure of each of these applications is incorporated herein by reference in its entirety.

STATEMENT REGARDING FEDERALLY SPONSORED RESEARCH OR DEVELOPMENT

Not applicable.

TECHNICAL FIELD

This present disclosure relates generally to a system and method for improving the masking of a gas turbine engine component in preparation for an electroplating process. More specifically, embodiments of the present disclosure relate to an improved masking tool which provides for ease of use, rapid tool production, and reduced handling of gas turbine engine parts during the plating process.

BACKGROUND OF THE DISCLOSURE

A gas turbine engine typically includes a multi-stage compressor coupled to a multi-stage turbine via an axial shaft. Air enters the gas turbine engine through the compressor where its temperature and pressure increase as it passes through subsequent stages of the compressor. The compressed air is then directed to one or more combustors where it mixes with a fuel source to create a combustible mixture. This mixture is ignited in the one or more combustors to create a flow of hot combustion gases. These gases are directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

The turbine section of the gas turbine engine typically includes a plurality of alternating stages of rotating and stationary airfoils. Due to the operating temperatures and mechanical load experienced in the turbine section, these rotating and stationary airfoils, also commonly referred to as blades and vanes, respectively, are cast from high strength, high temperature alloys, such as nickel and cobalt. Depending on the specific temperature at each stage of the turbine, many of these blades and vanes are hollow and air-cooled. In order to maximize and extend service life, many blades and vanes include the application of one or more coatings to various internal and external surfaces of the blade and vane.

One such coating process applied to internal and external surfaces of turbine airfoils is the electroplating of exotic materials, such as platinum. The application of platinum composite coatings to turbine airfoils creates a highly refractory and temperature resistant component with increased hot corrosion resistance and reduced oxidation levels, thus extending the maintenance intervals and overall life of the turbine airfoil.

Traditionally, successful electroplating of components in such industrial type applications, such as turbine blade and vane manufacturing, requires the process to exhibit good electrical properties, ductility, good diffusion properties and even thickness distribution. In an electroplating process, an electric current is used to reduce dissolved metal particles, such that the dissolved particles form a thin metal coating on a surface, thus improving the surface properties of the part. The part to be plated typically serves as the cathode in the circuit while the metal to be plated to the part is the anode. The parts are placed in a solution, the electrolyte, containing dissolved metal salts and ions that permit the flow of electricity. Upon a flow of electricity to the system, the dissolved metal ions in the solution “plate out” onto the cathode, or the gas turbine engine component, thus forming a thin coating over the desired surface.

While there are various materials that can be used and numerous turbine airfoil geometries to which such coating can be applied, one common problem experienced industry-wide is the time and effort expended to prepare the parts for the coating process. Typically, the portion of the airfoil exposed to the hot combustion gases and certain adjacent regions are the sections being coated while the remaining portions are masked or protected from the coating process. This masking process can be a labor-intensive, timely and costly process, as each part is individually taped, or otherwise protected in preparation for the coating process and then after the plating process, the masking is removed and the part is cleaned.

Typical electroplating processes use metal tooling fabricated from multiple parts to contain the gas turbine component and manipulate the component during the electroplating process. The manufacturing of these tools often takes considerable time and is expensive due to the traditional tooling manufacturing techniques utilized. Historically, these tools also implement the use of fasteners to secure parts together requiring handheld tools and additional handling and manipulation of the parts to be plated.

BRIEF SUMMARY OF THE DISCLOSURE

The following presents a simplified summary of the disclosure to provide a basic understanding of some aspects thereof. This summary is not an extensive overview of the application. It is not intended to identify critical elements of the disclosure or to delineate the scope of the disclosure. Its sole purpose is to present some concepts of the disclosure in a simplified form as a prelude to the more detailed description that is presented elsewhere herein.

In an aspect of the disclosure, a system for securing a component for an electrically-driven process is disclosed. The system includes a main body having an opening, a retention slot configured for retaining the component, and a channel. The system includes a fastener extending through the opening in the main body, and an insert inserted into the channel. The system has a shank movably coupled to the fastener and configured to contact the insert. The insert is configured to maintain electrical contact between the shank and the component when the component is retained within the retention slot.

In an aspect, according to any one of the preceding aspects, the insert includes a flat spring.

In an aspect, according to any one of the preceding aspects, the component displaces the flat spring from its steady state when the component is inserted into the retention slot.

In an aspect, according to any one of the preceding aspects, the insert includes a support having a projection configured to contact the component when the component is retained within the retention slot.

In an aspect, according to any one of the preceding aspects, the system includes a cover plate having a locking tab.

In an aspect, according to any one of the preceding aspects, the main body includes a socket for receiving the locking tab.

In an aspect, according to any one of the preceding aspects, the main body has a relief slot and the locking tab has a catch configured to extend through the relief slot.

In an aspect, according to any one of the preceding aspects, at least one of the main body and the fastener is additively manufactured from a polymer material.

In an aspect, according to any one of the preceding aspects, the shank extends through an aperture in the insert.

In an aspect, according to any one of the preceding aspects, the insert is additively manufactured from a conductive material.

In an aspect, according to any one of the preceding aspects, the electrically-driven process includes an electroplating process.

In an aspect, according to any one of the preceding aspects, the component is a gas turbine component.

In an aspect, according to any one of the preceding aspects, the gas turbine component is at least one of a blade and a vane.

In an aspect, according to any one of the preceding aspects, the insert is configured to maintain electrical contact between the shank and the component when the component is retained within the retention slot and moves relative to the shank.

In an aspect, a system for securing a gas turbine component for an electrically-driven process is disclosed. The system includes a main body having an opening, a retention slot configured to receive a dovetail of the gas turbine component, and a channel. The system has a fastener extending through the opening in the main body, and an insert inserted into the channel. The insert has a flat spring and a stop having an aperture. The insert is in contact with the gas turbine component. The system includes a shank movably coupled to the fastener, the shank extending through the stop and contacting the flat spring.

In an aspect, according to any one of the preceding aspects, the main body includes a notch for engaging a projection of the stop.

In an aspect, according to any one of the preceding aspects, the insert includes a support having a protrusion.

In an aspect, according to any one of the preceding aspects, the system is configured to mask at least a portion of the gas turbine component during the electrically-driven process.

In an aspect, a system for masking a component for an electrically-driven process is provided. The system includes a main body having a retention slot configured for retaining the component, and a fastener extending through the main body. The system includes an insert. A shank is movably coupled to the fastener and is configured to contact the insert while the component is retained within the retention slot.

In an aspect, according to any one of the preceding aspects, the insert comprises a flat spring.

In an aspect, according to any one of the preceding aspects, the system includes a cover plate having a locking tab configured to be received in a socket in the main body.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein.

DETAILED DESCRIPTION

Figure 1:
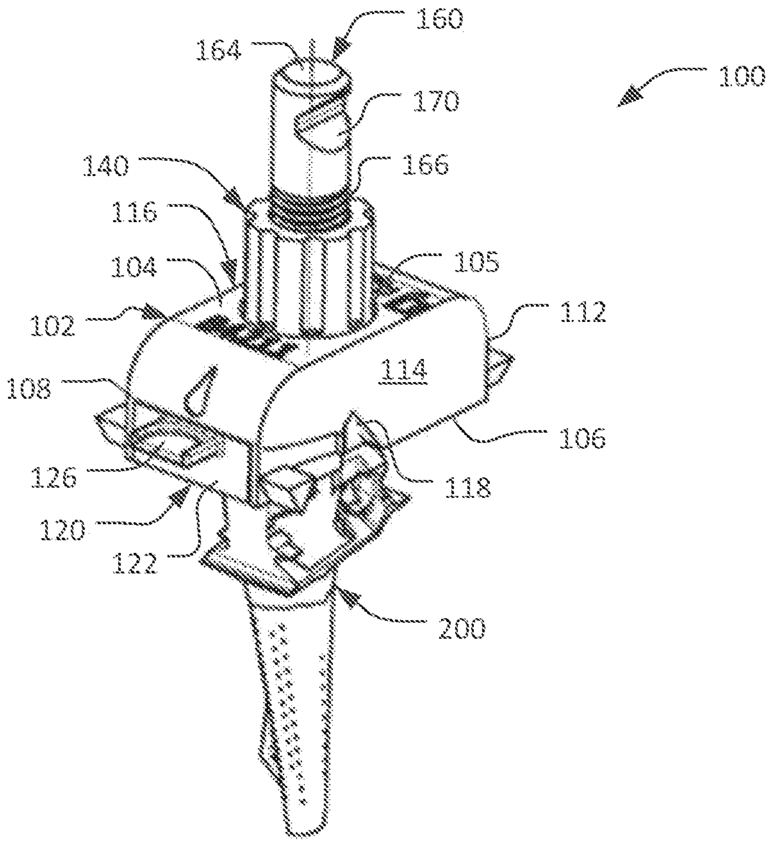
FIG. 1 is a perspective view of a system for securing a gas turbine component for an electroplating process, according to some aspects of the disclosure.
Figure 2:
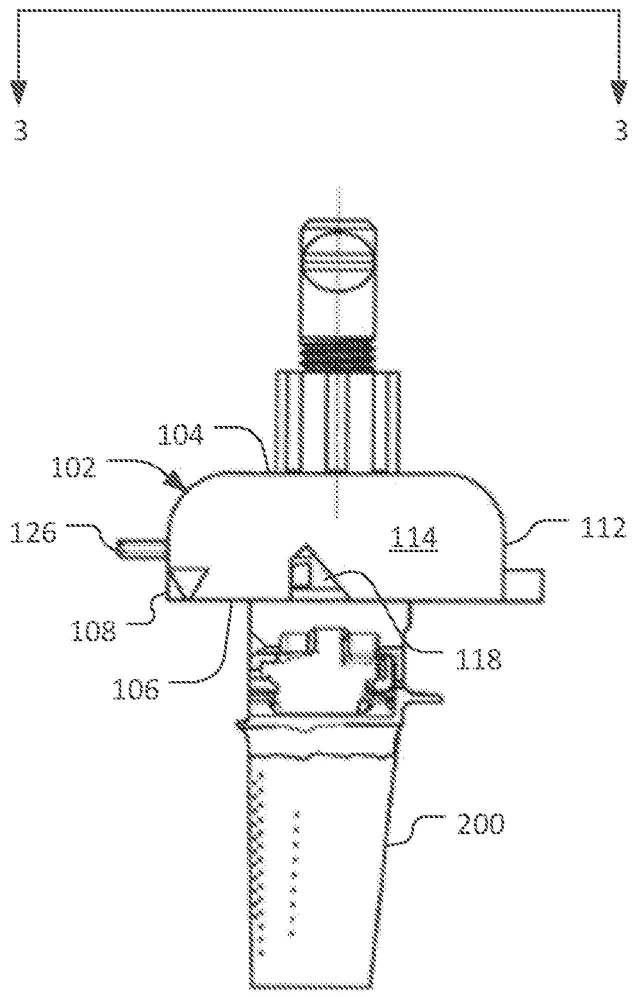
FIG. 2 is an elevation view of the system of FIG. 1, according to some aspects of the disclosure.
Figure 3:
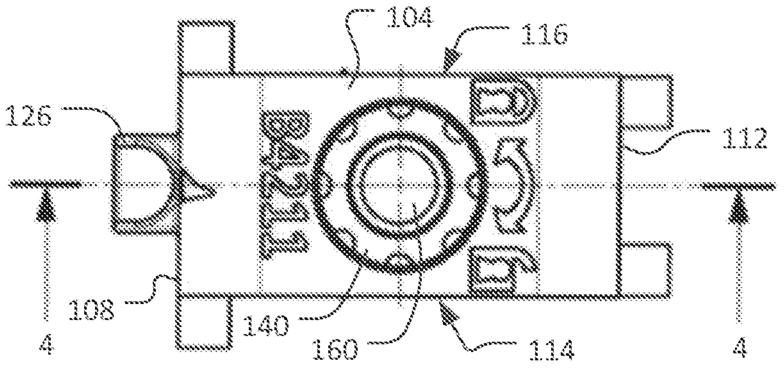
FIG. 3 is a top elevation view of the system of FIG. 2, according to some aspects of the disclosure.

The present disclosure is intended for use in the manufacturing or repair of a gas turbine engine component, such as a turbine blade, vane, or other gas turbine component undergoing an electroplating process. As such, the present disclosure is capable of being used with a variety of gas turbine engine components, regardless of the manufacturer.

As embodied by the disclosure, a gas turbine engine component, such as a turbine blade and vane, is a complex component. The component may have intricate geometric profiles including cooling features, cooling holes, thin walls, and operates under extreme operating temperatures and mechanical loading. Depending on the operating conditions, it is often desirable to apply one or more coatings to the surfaces of the component, such as a blade or vane, to reduce oxidation and erosion and to shield the component from the high operating temperatures.

The present disclosure provides an improved system for fixturing a gas turbine engine component undergoing an electroplating process. Through the present disclosure, the need for manual masking of surfaces not being coated is greatly reduced, thereby saving time, reducing costs, and reducing the amount of contact with the component during the coating process. The likelihood of damaging the component during the coating process is therefore reduced.

Various embodiments of the present disclosure are depicted in FIGS. 1-7B. Referring initially to FIGS. 1-5, a system 100 for securing a gas turbine engine component undergoing an electroplating process is provided. The system 100 includes a main body 102 having a top surface 104 with a top opening 105, and bottom surface 106 that opposes top surface 104. The main body 102 also includes a first end 108 having an opening 110 therein (see FIG. 5) and an opposing second end 112. Located within the main body 102 is a retention slot 113 (see FIG. 5), which is sized accordingly for securing the gas turbine component 200 in the main body 102 at a predetermined orientation. A first sidewall 114 and a second sidewall 116 are spaced between the first end 108 and the second end 112, where at least one of the first sidewall 114 and the second sidewall 116 have a relief slot 118.

The system 100 further includes a removeable cover plate 120 positioned within the opening 110 of the first end 108. In an embodiment of the disclosure, the cover plate 120 includes an end plate 122 and one or more locking tabs 124 for engaging a corresponding relief slot 118 in at least one of the first sidewall 114 and the second sidewall 116. In the embodiment of the disclosure depicted in FIGS. 1-5, the cover plate 120 includes two locking tabs 124, for engaging a relief slot 118 in each of the first sidewall 114 and the second sidewall 116. Extending from the end plate 122 and opposite of the locking tabs 124, is a pull tab 126. In order to remove the cover plate 120, the locking tabs 124 are depressed at the relief slots 118 and the pull tab 126 is used to pull the cover plate 120 out of the main body 102. As embodied by the disclosure, the one or more locking tabs 124 is but one type of mechanism for securing the cover plate to the main body. The one or more locking tabs 124 is a configuration that lends itself to production by way of the additive manufacturing process with a polymer material, as described herein. Alternate mechanisms for securing the cover plate, such as traditional fasteners or other locking devices, may also be utilized depending on the type of material used and how the main body and cover plate are manufactured.

A fastener 140 is moveably secured within the main body 102 and extends through the top surface 104. This is more clearly depicted in FIG. 4, which is a cross section of the system 100. The fastener 140 is generally cylindrical in shape and configured such that it includes a flared end 142 having a diameter greater than the top opening 105 such that the fastener 140 is retained within the main body 102. However, the flared end 142 is undersized with respect to the cavity provided in the main body 102, thereby permitting the fastener 140 to rotate and move within the main body 102. The fastener 140 further includes an internal opening 144, a portion of which includes internal threads 146.

Figure 4:
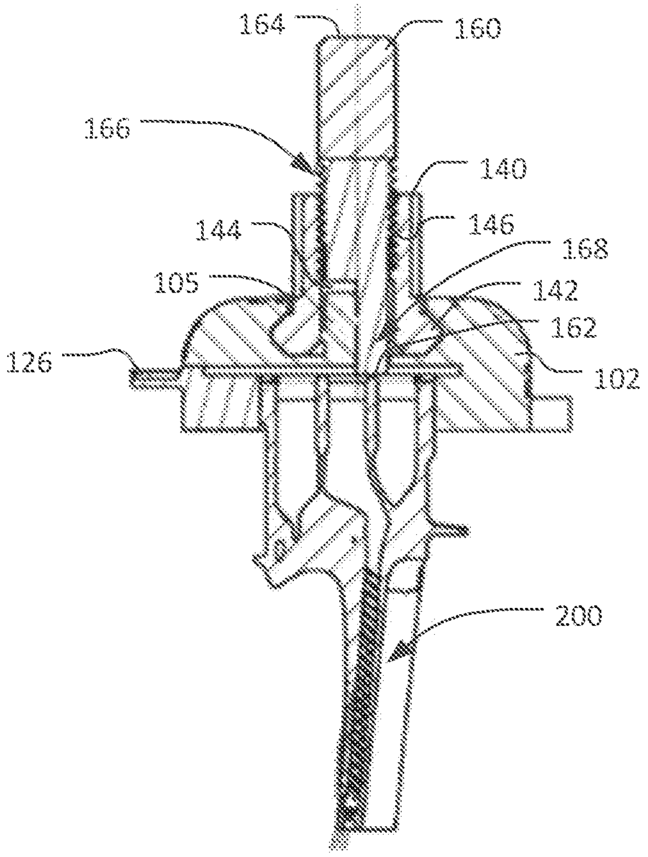
FIG. 4 is a cross-section view of the system of FIG. 3, according to some aspects of the disclosure.
Figure 5:
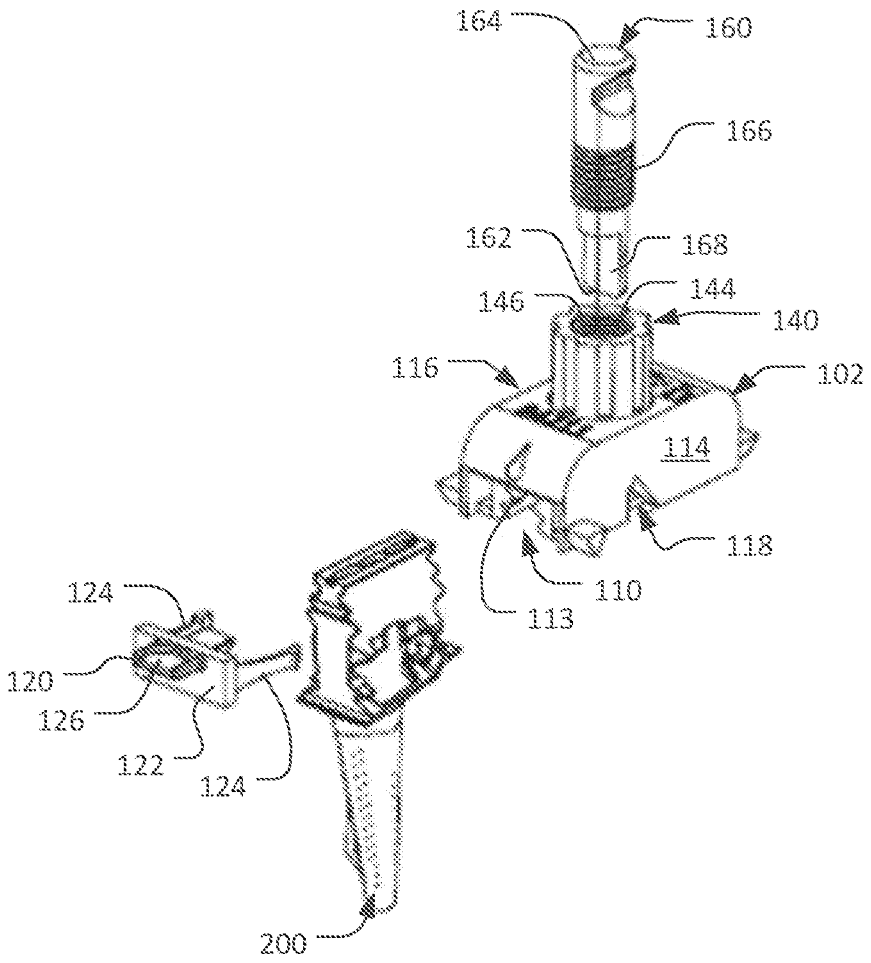
FIG. 5 is an exploded perspective view of the system of FIG. 1, according to some aspects of the disclosure.

The system 100 also includes a shank 160 having a first end 162 and an opposing second end 164. The shank 160 includes a threaded portion 166 located along a portion of the shank outer surface between the first end 162 and the second end 164. The shank 160, as depicted in FIGS. 4 and 5, also includes an asymmetric profile 168 proximate the first end 162. The asymmetric profile 168 is sized to align with the contact surface of the gas turbine component 200. The shank 160 also includes a notch 170 (see FIG. 1) proximate the second end 164 for fixturing the part to be plated in the assembly tooling as described further below. The shank 160 is fabricated from a conductive material, which is necessary for closing the electrical circuit between the electrical source and the gas turbine component 200 during the electroplating process. One such material utilized for the shank 160 is titanium. In other examples of the embodiments, the shank 160 may be fabricated using stainless steel, tungsten carbide, or other suitable conductive material.

As shown in FIGS. 1-4, the shank 160 is engaged with the fastener 140 by the corresponding threaded portion 166 of shank 160 and internal threads 146 of fastener 140. More specifically, the shank 160 is placed within the internal opening 144 of the fastener 140 and upon rotation of the fastener 140, the first end 162 of the shank 160 is drawn into contact with a gas turbine component 200 positioned within the main body 102.

For the system 100 depicted in FIGS. 1-5, the gas turbine component 200 fixtured in the system 100 is a turbine blade. As depicted, the portion of the blade not masked by the system 100, the blade neck and airfoil, is exposed beneath the bottom surface 106 of the main body 102, thus permitting these regions to undergo the electroplating process, unless otherwise masked by an additional tool or traditional masking process. The blade is held within the main body 102 by a retention slot 113 having a profile corresponding to the attachment or root portion of the blade. The present disclosure is not limited to the configuration depicted but includes alternate blade configurations having different style retention slots 113. Depending on the surfaces to undergo the electroplating process, the size and shape of the main body 102, or housing as it is also referred to, will vary or the blade may be repositioned as needed within the main body 102. Furthermore, it is also envisioned that the present disclosure is not limited to use with a turbine blade. Various other gas turbine engine components, such as turbine vanes, shroud duct segments, or other components can also be fixtured utilizing the present disclosure. Furthermore, while the present disclosure applies to a gas turbine engine component, it is conceivable to apply aspects of the present disclosure to technologies requiring electroplating processes other than gas turbine technology.

The system 100 provides an improvement over the manual masking techniques utilized in the prior art by providing reusable tooling into which a gas turbine component 200 can be secured. The system 100 undergoes an electroplating process, and the gas turbine component 200 is then removed. The system 100 or portions thereof may be reused.

The system 100 can be fabricated through a variety of processes and from a variety of materials. While the main body 102, the removeable cover plate 120, and the fastener

140 can be manufactured and assembled using typical machining and assembly techniques, such processes are costly and time consuming. Each of these components of system 100 can be fabricated from an additive manufacturing or 3-D printing process. Furthermore, for such rapid manufacturing techniques, each of the main body 102, the removeable cover plate 120 and the fastener 140 can be fabricated from a rigid polymer material having suitable strength to manipulate a gas turbine engine component and a softening temperature of about 365K. One such acceptable material is Acrylonitrile Butadiene Styrene (ABS) and may have ultraviolet (UV) tolerant properties if needed, such as Acrylonitrile Styrene Acrylate (ASA). Using these materials, the main body 102, the removeable cover plate 120 and the fastener 140 can be produced using additive manufacturing methods such as fused deposition modeling 3-D printing or other acceptable means.

When utilizing an additive manufacturing process with the materials outlined above, the main body 102 and fastener 140 can be fabricated integrally so there is no need for multiple parts or complicated assembly techniques to form the main body 102. That is, the main body 102 and fastener 140 can be printed such that a soluble material is printed between the surfaces of main body 102 surrounding the fastener 140. Then, the soluble material between the main body 102 and fastener 140 may be dissolved, thereby creating a gap between the main body 102 and the fastener 140; such may allow the fastener 140 to rotate and move within the main body 102, but yet be contained by the top surface 104 of the main body 102.

In an embodiment of the disclosure, a method of preparing a gas turbine engine component for an electroplating process is provided. A masking system as outlined herein, including a main body 102, a removeable cover plate 120 having an end plate 122 and one or more locking tabs 124, a fastener 140 located at least partially within the main body 102, and a shank 160 engaged with the fastener 140, is provided. The gas turbine component 200 is then placed through an opening in the main body 102 such that the component 200 is held within the main body 102 by a retention slot 113. Once the gas turbine component 200 is positioned within the main body 102, the removeable cover plate 120 is positioned over the opening in the main body, such that the one or more locking tabs 124 extend into the main body 102 and are secured to one or more corresponding relief slots 118 in the sidewalls of the main body 102. A shank 160, which is fabricated from a conductive material and has external threads located thereon, is then inserted into the fastener 140 and the fastener 140 is rotated relative to the shank 160, thereby drawing the shank 160 into contact with the gas turbine component 200.

Once the gas turbine component 200 is secured within the main body 102, the system 100 is secured to the adjacent tooling for placing the gas turbine component 200 in the solution and for connecting the gas turbine component 200 to a source of electrical charge to complete the plating process. One such assembly utilizing the system 100 is depicted in FIGS. 6A-7B.

Figure 6A:
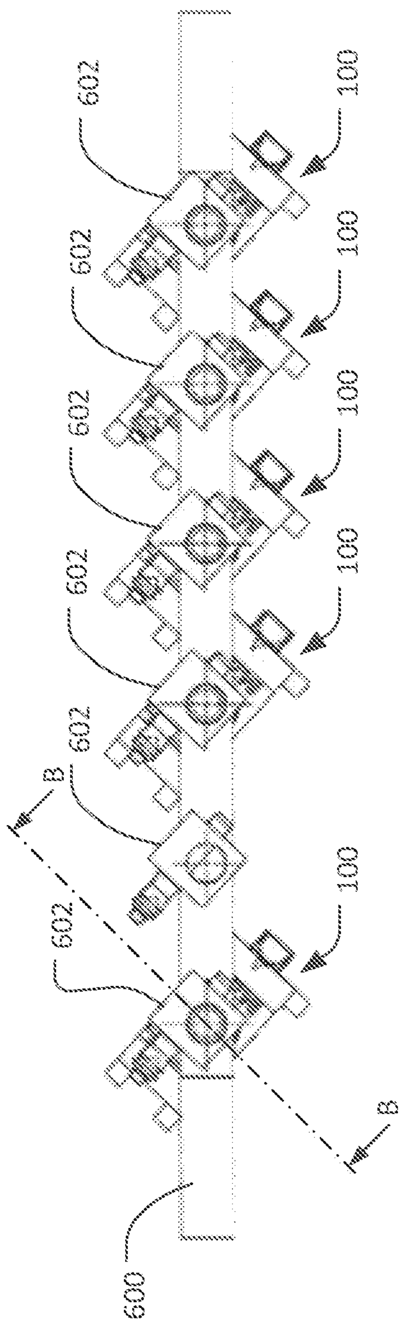
FIG. 6A is a top elevation view of a plurality of gas turbine engine components each utilizing the system of FIG. 1, according to some aspects of the disclosure.
Figure 6B:
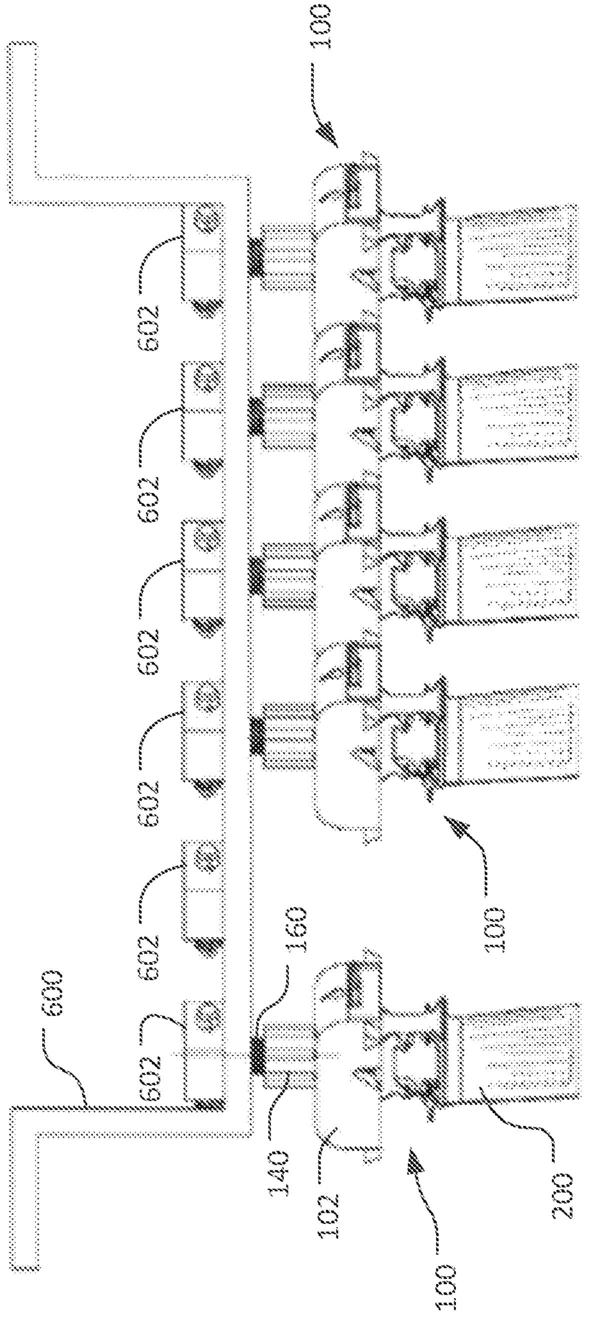
FIG. 6B is a side elevation view of the system depicted in FIG. 6, according to some aspects of the disclosure.
Figure 7A:
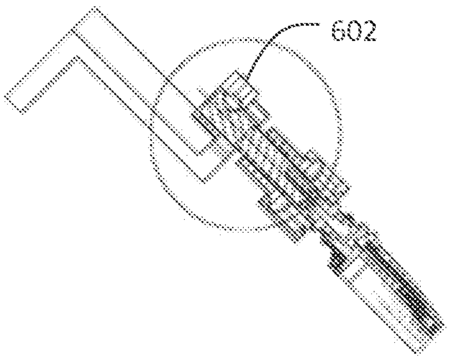
FIG. 7A is a cross section view of a system of FIG. 1 secured to the electroplating equipment according to some aspects of the disclosure.
Figure 7B:
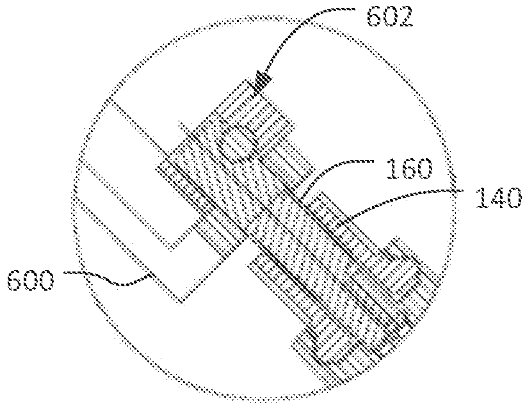
FIG. 7B is a detailed cross section view of a portion of the system of FIG. 7A, according to some aspects of the disclosure.

Referring now to FIGS. 6A and 6B, a top elevation view and side elevation view, respectively, of an electroplating assembly are depicted and include a plurality of systems 100 for securing gas turbine engine components for an electroplating process. A plurality of systems 100 are shown coupled to a support bar 600 through respective mounting fixtures 602 which are shown in additional detail and cross section in FIGS. 7A and 7B. The mounting fixture 602 is fabricated from a conductive material and is maintained in contact with the shank 160, which is in turn in contact with gas turbine component 200, as discussed above. In the electroplating process, a source of electric current is provided to each of the mounting fixtures 602 and to the corresponding gas turbine engine component by way of direct contact with the shank 160.

Often times, prior to a part undergoing an electroplating process, it is necessary for certain surfaces of the gas turbine component to be masked to protect these surfaces from the electroplating materials and process. For example, the present disclosure can be used as part of a system of gas turbine components fixtured for an electroplating process. One such masking process in which the present disclosure may be utilized is in conjunction with a ultraviolet cured maskant that is applied robotically to the gas turbine components once secured in the tooling fixtures, as discussed above and shown in FIGS. 6A and 6B. Use of the present disclosure provides for a controlled attachment of the gas turbine component 200 to the support bar 600 and mounting fixtures 602 and manipulation of the assembly for the application of additional maskant.

Electroplating of the gas turbine component 200 in the electrolytic solution may cause the electrolytic solution to reach extremely high temperatures, such as a temperature of about 373K or more. The electrolytic solution may continuously evaporate at this temperature and the resultant steam may contact the system 100, including main body 102 thereof. This high-temperature steam may cause main body 102, which as discussed may be made of a polymer material, to expand. Expansion of main body 102 may cause retention slot 113 to also expand, and consequently, gas turbine component 200 may move in a downward direction within the retention slot 113. The shank 160, however, may be threadingly coupled to fastener 140, and as such, may not move with the gas turbine component 200. The relative movement between shank 160 and gas turbine component 200 may cause shank 160, which is initially in physical contact with gas turbine component 200, to no longer contact the gas turbine component 200. The electrical contact between shank 160 and gas turbine component 200 may therefore be severed, resulting in disruption of the electroplating process. Such may cause the gas turbine component 200 to be unevenly electroplated, and the gas turbine component 200 may have to be reworked or scrapped. It may be beneficial to ensure that electrical contact between gas turbine component 200 and shank 160 is maintained for the duration of the electroplating process.

Figure 8A:
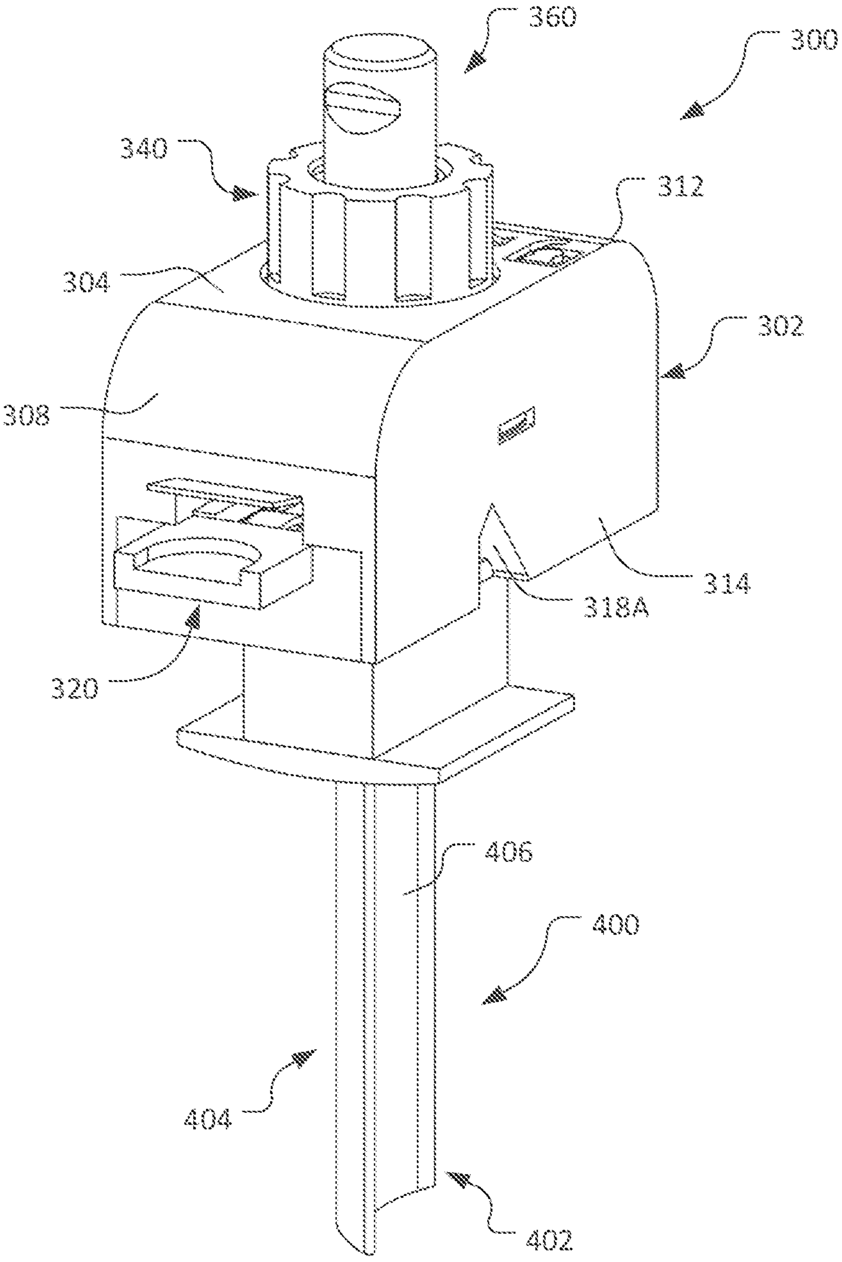
FIGS. 8A-8B are perspective views of a system for securing a gas turbine component undergoing an electroplating process, according to some aspects of the disclosure.
Figure 8B:
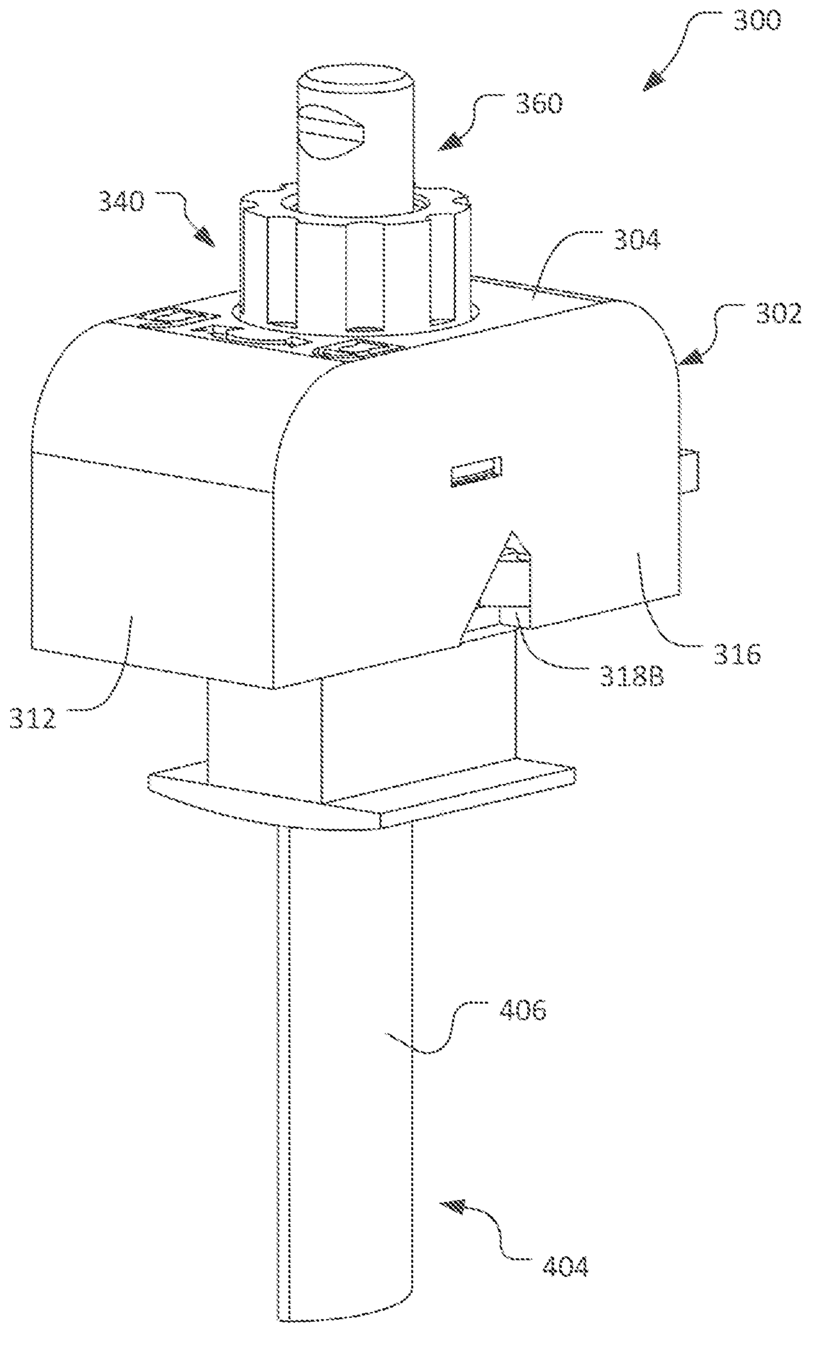
Figure 9A:
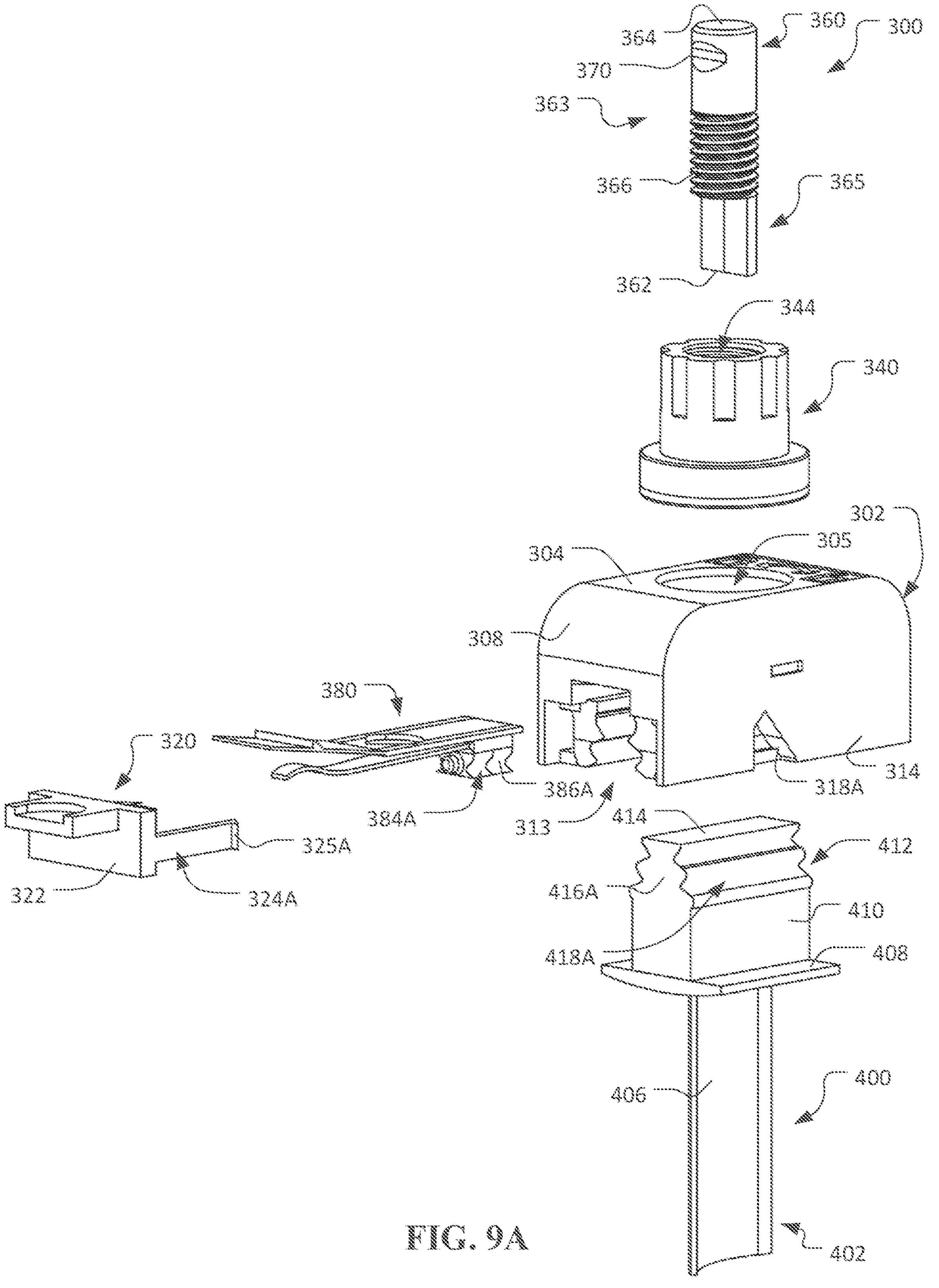
FIGS. 9A-9B are exploded views of the system of FIGS. 8A-8B, according to some aspects of the disclosure.
Figure 9B:
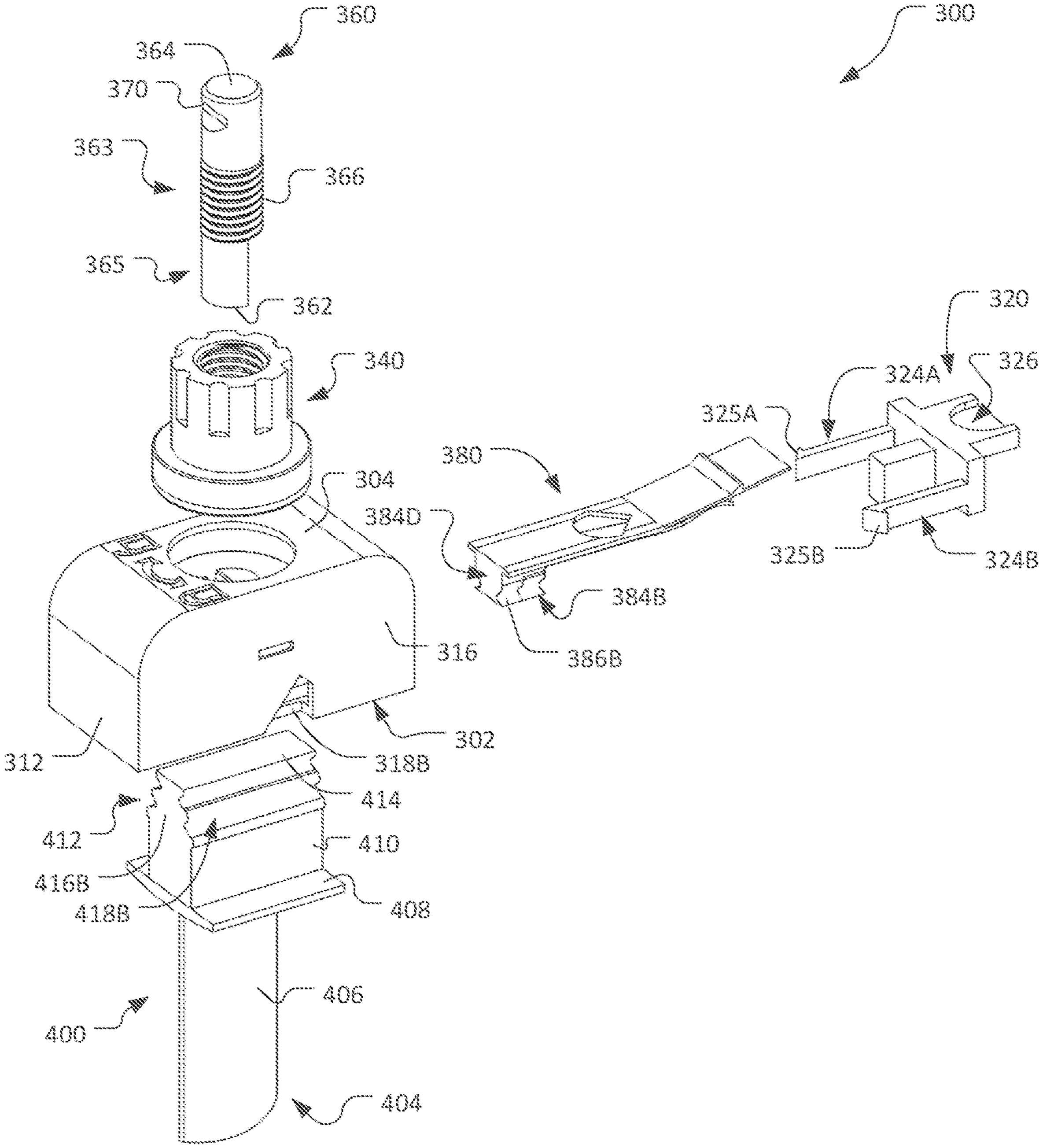

Focus is directed to FIGS. 8A-8B and 9A-9B. FIGS. 8A-8B show a system 300 for securing a gas turbine component 400 undergoing an electroplating process, according to certain aspects of the disclosure. FIGS. 9A-9B show an exploded view of the system 300. The system 300 may be similar to system 100 except as noted and/or shown. Corresponding reference numbers may be used to indicate corresponding parts, though with any noted deviations.

The system 300, like system 100, may include a main body 302 having a top surface 304, a bottom surface 306 (see FIG. 15A), a first end 308 (see FIGS. 8A and 9A), a second end 312 (see FIGS. 8B and 9B), a first sidewall 314 (see FIGS. 8A and 9A), and a second sidewall 316 (see FIGS. 8B and 9B). The bottom surface 306 may oppose the top surface 304, the second end 312 may oppose the first end 308, and the second sidewall 316 may oppose the first sidewall 314. The first sidewall 314 and second sidewall 316 may be spaced apart and may extend between the first end 308 and the second end 312.

First sidewall 314 may include a relief slot 318A (see FIGS. 8A and 9A) and second sidewall 316 may include a relief slot 318B (FIGS. 8B and 9B). The top surface 304 may include an opening 305 (see FIG. 9A). Relief slots 318A and 318B of system 300 may generally correspond to relief slots 118 of system 100, and opening 305 of system 300 may generally correspond to top opening 105 of system 100. In some examples of the embodiments, one or both relief slots 318A and 318B may be omitted.

System 300 may include a cover plate 320 that generally corresponds to cover plate 120 of system 100. In an embodiment of the disclosure, the cover plate 320 includes an end plate 322 and one or more locking tabs for engaging a corresponding relief slot 318A in first sidewall 314 and relief slot 318B in second sidewall 316 of main body 302. For example, as illustrated in FIG. 9B, cover plate 320 may include a first locking tab 324A and a second locking tab 324B. First locking tab 324A, at a terminal end thereof, may include a latch or projection 325A. Similarly, second locking tab 324B, at a terminal end thereof, may include a latch or projection 325B. Latch 325A may extend away from latch 325B and latch 325B may extend away from latch 325A. A pull tab 326 may extend from the end plate 322 opposite the first and second locking tabs 324A and 324B. Latch 325A of first locking tab 324A may engage relief slot 318A in first sidewall 314 and latch 325B of second locking tab 324B may engage relief slot 318B in second sidewall 316 to removably couple the cover plate 320 to main body 302, as discussed herein. To disassociate the cover plate 320 from main body 302, each of latch 325A and latch 325B may be respectively depressed at relief slots 318A and 318B, and the pull tab 326 may be used to pull the cover plate 320 out of the main body 302. As embodied by the disclosure, the first locking tab 324A and second locking tab 324B are but one type of mechanism for securing the cover plate 320 to the main body 302. The first and second locking tabs 324A and 324B are a configuration that lends itself to production by way of an additive manufacturing process with a polymer material. Alternate mechanisms for securing the cover plate 320 to main body 302, such as traditional fasteners or other locking devices, may alternately or additionally be utilized depending on the type of material used and how the main body 302 and cover plate 320 are manufactured.

Figure 11A:
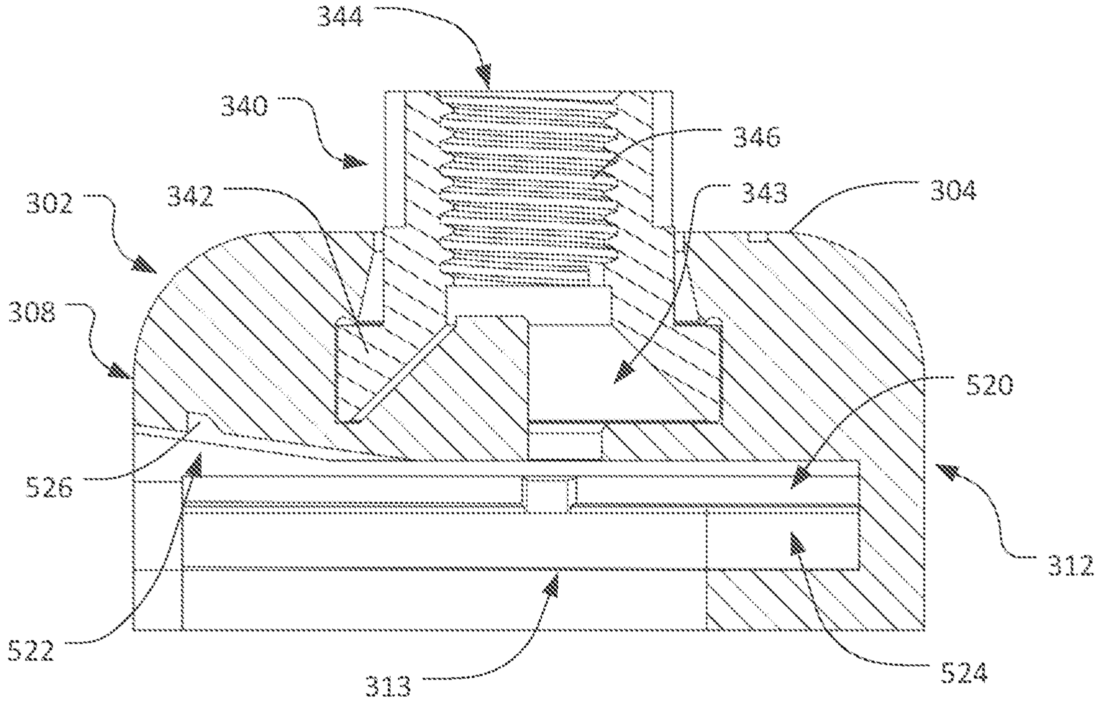
FIGS. 11A-11E are schematics illustrating example operation of the system of FIGS. 8A-8B, according to some aspects of the disclosure.
Figure 12A:
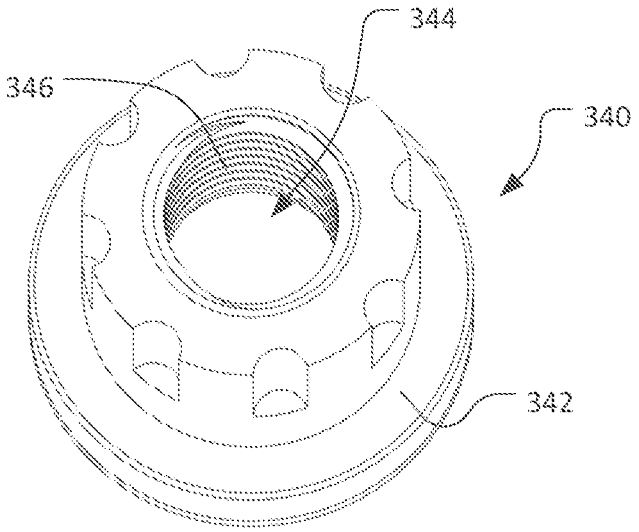
FIGS. 12A-12B are perspective views of a fastener of the system of FIGS. 8A-8B, according to some aspects of the disclosure.
Figure 12B:
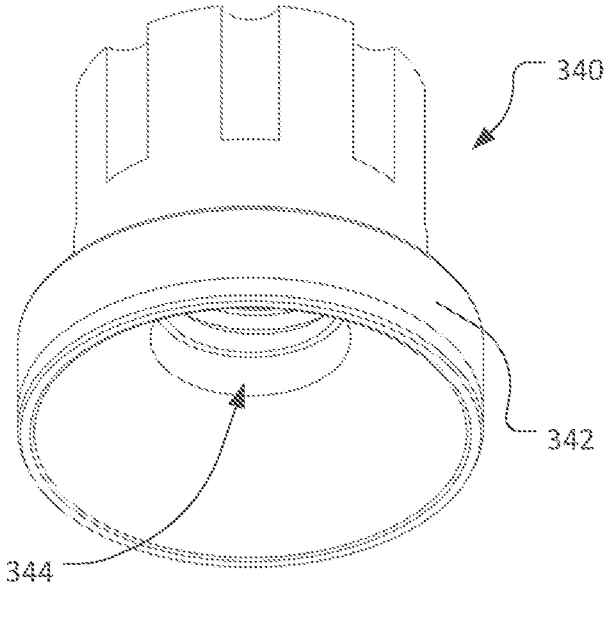

System 300 may include a fastener 340 (see FIGS. 9A-9B and FIGS. 12A-12B) that generally corresponds to fastener 140 of system 100. Fastener 340 may be moveably secured within the main body 302 and may extend through top surface 304. FIG. 11A shows a cross section of main body 302 with fastener 340 movably (such as rotatably) coupled thereto. Fastener 340 may be generally cylindrical in shape and may include a flared end 342 having a diameter greater than a diameter of opening 305 (see FIG. 9A) such that the fastener 340 is retained within the main body 302. The flared end 342 may however be undersized with respect to a cavity 343 provided in the main body 302 below opening 305, which may permit fastener 340 to rotate and move within the main body 302. Fastener 340 may include an internal opening 344 (see FIG. 12A), all or part of which may include internal threads 346.

Figure 13:
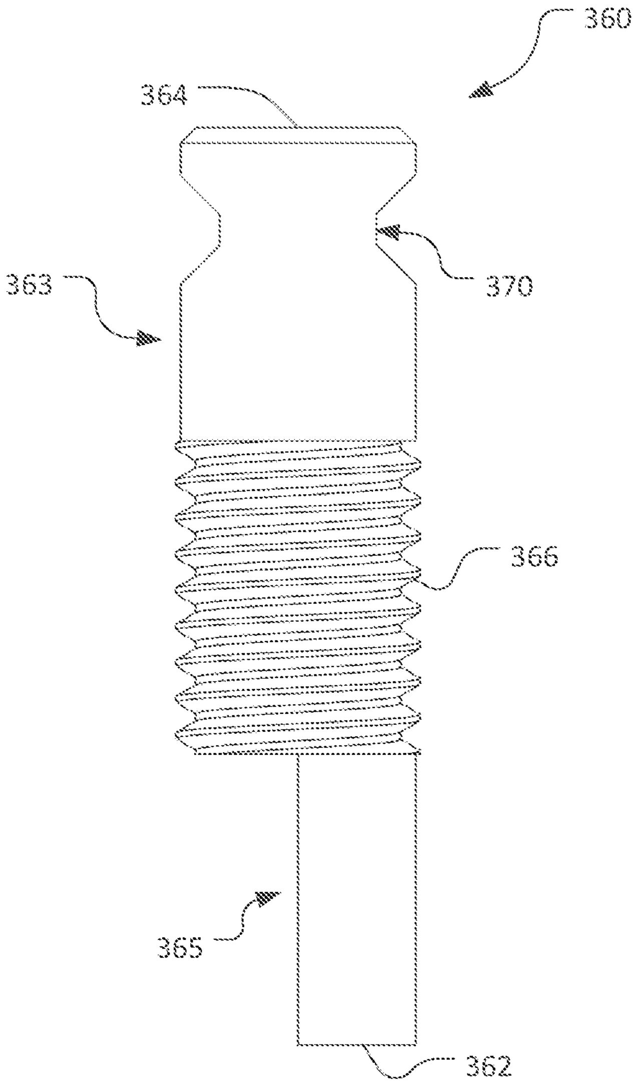
FIG. 13 is a perspective view of a shank of the system of FIGS. 8A-8B, according to some aspects of the disclosure.

System 300 may include a shank 360 (see FIGS. 9A-9B and FIG. 13) that may generally correspond to shank 160 of system 100. Shank 360 may include a first end 362, an opposing second end 364, a first portion 363, and a second portion 365. First portion 363 may extend from second end 364 to second portion 365, and second portion 365 may extend from first portion 363 to first end 362. In some examples of the embodiments, the first portion 363 may be generally cylindrical and the second portion 365 may be generally semi-cylindrical. In other examples of the embodiments, all or part of the first portion 363 or the second portion 365 may be frusto-cylindrical, rectangular, pyramidal, or have another symmetrical or asymmetrical shape.

First portion 363 may include a threaded area 366 having threads along the outer surface of shank 360. Second portion 365 may extend from the threaded area 366 and terminate at the first end 362. Second portion 365 may be configured to contact a surface of gas turbine component 400, as discussed herein. The shank 360 may also include a notch 370 proximate the second end 364 for fixturing the system 300 together with the gas turbine component 400 for the electroplating process. As embodied by the disclosure, shank 360 is fabricated from a conductive material to allow for the closing of the electrical circuit between the electrical source and the gas turbine component 400 during the electroplating process. In some examples, shank 360 includes titanium. In other examples of the embodiments, shank 360 includes stainless steel, aluminum, or other metals or metal alloys.

As discussed herein, system 300 may be used to secure gas turbine component 400 undergoing an electroplating process. The gas turbine component 400 may be a blade, a vane, a duct segment, a shroud, or other gas turbine component. In some aspects of the embodiments, gas turbine component 400 may have a pressure side 402 (see FIG. 9A) and a suction side 404 (see FIG. 9B). In the illustrated example, gas turbine component 400 has an airfoil 406, a platform 408 (see FIGS. 9A-9B), a blade shank 410, and a dovetail 412. The airfoil 406 may extend radially outwardly from platform 408 and the blade shank 410 may extend radially inwardly from platform 408. The dovetail 412 may extend radially inwardly from blade shank 410. The dovetail 412 may terminate at a bottom wall 414 that may span opposing dovetail ends 416A (FIG. 9A) and 416B (FIG. 9B). The dovetail 412 may include one or more serrations or tangs that extend laterally from one dovetail end 416A to opposing dovetail end 416B. For example, tangs 418A (see FIG. 9A) may extend from dovetail end 416A to dovetail end 416B at the pressure side 402 of component 400 and tangs 418B may extend from dovetail end 416A to dovetail end 416B at the suction side 404 of component 400.

One difference between system 100 and system 300 may be that system 300 may include an insert 380 (see FIGS. 9A-9B and FIGS. 14A-14B) not present in system 100. Insert 380 may be formed of conductive material. In some examples, insert 380 may be fabricated from or include titanium. In other examples of the embodiments, insert 380 may be fabricated using stainless steel, tungsten carbide, or other suitable conductive material. The purpose of insert 380 will be described herein.

Figure 14A:
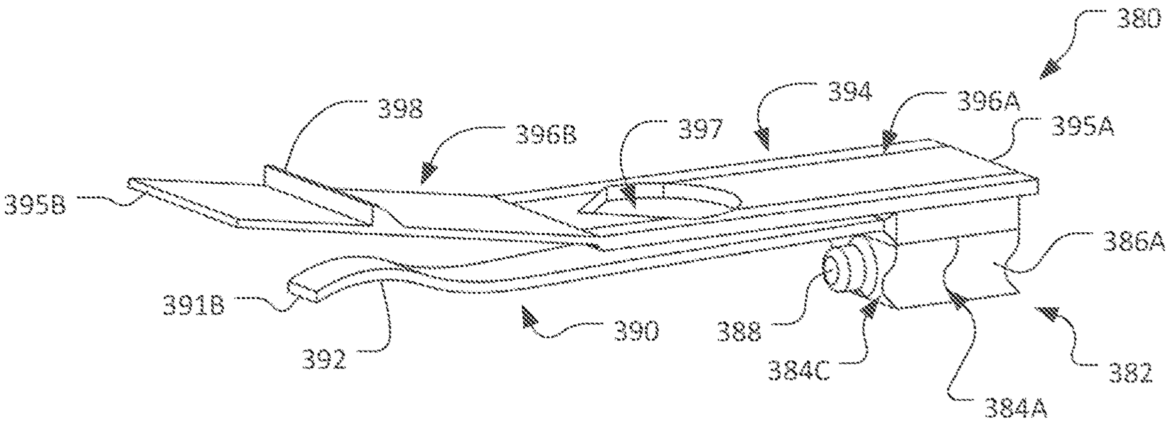
FIG. 14A is a perspective view of an insert of the system of FIGS. 8A-8B, according to some aspects of the disclosure.
Figure 14B:
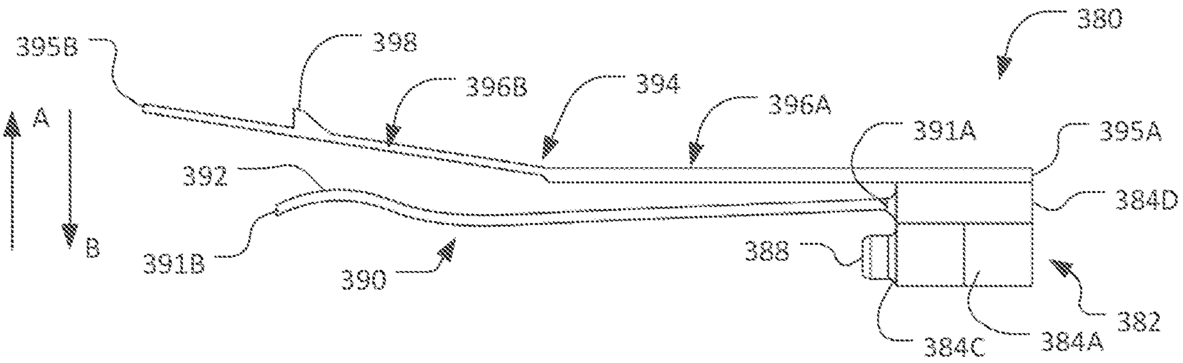
FIG. 14B is a side view of the insert of FIG. 14A, according to some aspects of the disclosure.

In some examples of the embodiments, insert 380 may include a base or support 382 (FIGS. 14A-14B). The support 382 may include a first side 384A (see FIGS. 9A and 14A), a second side 384B (see FIG. 9B), a first end 384C (see FIG. 14A) and a second end 384D (see FIG. 9B). First side 384A may oppose second side 384B, and first end 384C may oppose second end 384D. First side 384A and second side 384B may be spaced apart and each may extend between first end 384C and second end 384D.

In an aspect of the embodiments, first side 384A of support 382 may include one or more serrations 386A (see FIGS. 9A and 14A) that extend from first end 384C of support 382 to second end 384D thereof. Similarly, second side 384B of support 382 may include one or more serrations 386B (see FIG. 9B) that extend from first end 384C of support 382 to second end 384D thereof. Serrations 386A of insert 380 may generally correspond to one or more tangs 418A of dovetail 412 on pressure side 402 of gas turbine component 400, and serrations 386B of insert 380 may generally correspond to one or more tangs 418B of dovetail 412 on suction side 404 of gas turbine component 400.

A stopping member or protrusion 388 (see FIGS. 14A-14B) may extend from first end 384C of support 382 away from second end 384D. In some examples, the protrusion 388 may be generally cylindrical. In other examples of the embodiments, protrusion 388 may be rectangular, pyramidal, or be formed in other symmetrical or asymmetrical shapes.

A flat spring 390 may extend from first end 384C. In some examples, flat spring 390 may extend from first end 384C away from second end 384D. Flat spring 390 may have a first end 391A (see FIG. 14B) and a second end 391B. First end 391A may be supported by support 382 and may be disposed above protrusion 388. Second end 391B may be a free end. If the flat spring 390 in its steady state is pushed by an external force away from its steady state, such as in direction A (see FIG. 14B), the flat spring 390 may store the energy from this external force, and travel in direction B towards its steady state when the external force is removed.

In some examples of the embodiments, flat spring 390 may be generally rectangular, except for a curved or hooked portion 392 that terminates at second end 391B. The curved portion 392 may provide a gripping surface for a user to push, pull, or otherwise manipulate the insert 380. In other examples of the embodiments, flat spring 390 may be devoid of the curved portion 392 or may be formed in other regular or irregular shapes.

A stop 394 may extend away from second end 384D above flat spring 390. Stop 394 may have a first end 395A (see FIGS. 14A-14B) and a second end 395B. Stop 394 may be secured to support 382 at or proximate first end 395A, such as to a top surface of support 382. Second end 395B may be a free end. In an aspect of the disclosure, stop 394 may include a first portion 396A and a second portion 396B. First portion 396A may originate at first end 395A and terminate at second portion 396B, and second portion 396B may extend from first portion 396A at an angle and terminate at second end 395B.

First portion 396A of stop 394 may include an aperture 397. As discussed herein, aperture 397 may be sized so as to allow the shank 360, and specifically the second portion 365 (see FIG. 9B) of shank 360, to pass through aperture 397. Second portion 396B of stop 394 may include a catch or projection 398. Projection 398 may extend away from flat spring 390.

The main body 302 may have a retention slot 313 (see FIGS. 9A and 15A) formed therein. Like the retention slot 113 of system 100 which is configured to retain gas turbine component 200 in a predetermined orientation, retention slot 313 may be configured to retain gas turbine component 400 in a predetermined orientation.

Figure 15A:
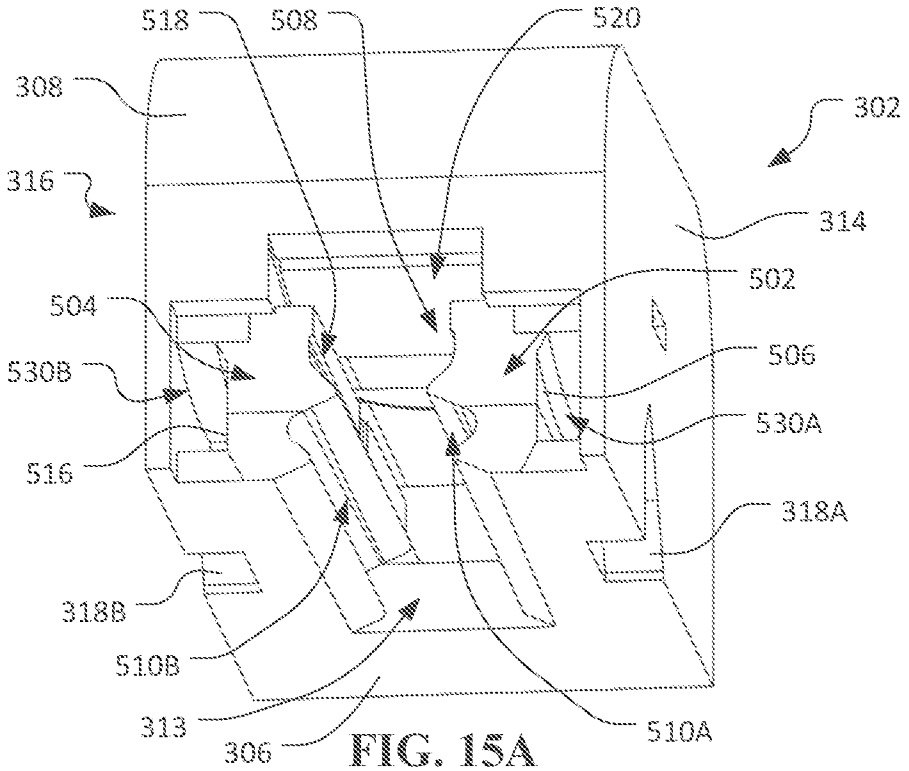
FIGS. 15A-15B are perspective views of a main body of the system of FIGS. 8A-8B, according to some aspects of the disclosure.

In more detail, main body 302 may have a first wall 502 (see FIG. 15A) and a second wall 504 that extend within main body 302 (see FIG. 15A). First wall 502 may originate at or proximate first end 308 of main body 302 and extend towards second end 312 (see FIG. 9B) of main body 302. Second wall 504 may likewise originate at or proximate first end 308 of main body 302 and extend towards second end 312 of main body 302.

In some examples of the embodiments, first wall 502 may have a first side 506 and a second side 508 that each extend within main body 302 along at least part of the length thereof. First side 506 of first wall 502 may be adjacent and spaced apart from the inner surface of first sidewall 314 of main body 302. Second side 508 of first wall 502 may include tangs 510A. Tangs 510A of first wall 502 within main body 302 may be configured to receive, such as matingly receive, each of serrations 386A (FIG. 14A) of insert 380 and tangs 418A (FIG. 9A) of dovetail 412 of gas turbine component 400.

Second wall 504 may likewise have a first side 516 and a second side 518 that each extend within main body 302 along at least part of the length thereof. First side 516 of second wall 504 may be adjacent and spaced apart from the inner surface of second sidewall 316 of main body 302. Second side 518 of second wall 504 may include tangs 510B. Tangs 510B may face tangs 510A. Tangs 510B of second wall 504 within main body 302 may be configured to receive, such as matingly receive, each of serrations 386B (FIG. 9B) of insert 380 and tangs 418B (FIG. 9B) of dovetail 412 of gas turbine component 400. At least a portion of retention slot 313 may be formed by the space between tangs 510A of first wall 502 and tangs 510B of second wall 504.

As noted above, one difference between system 300 and system 100 may be that system 300 may include insert 380 not present in system 100. Another difference between system 300 and system 100 may be that main body 302, unlike main body 102, may include a channel 520 (FIG. 15A) for receiving the insert 380.

FIG. 11A shows the retention slot 313 and channel 520 in cross-section. Channel 520 may include a first section 522 and a second section 524. First section 522 of channel 520 may extend along the length of main body 302. At least a portion of first section 522 of channel 520 may be above retention slot 313. At least a portion of second section 524 of channel 520 may be behind retention slot 313 and below first section 522 of channel 520. For example, second section 524 of channel 520 may be proximate second end 312 of main body 302 relative to retention slot 313. A notch 526 may be provided inside main body 302 above first section 522 of channel 520. Notch 526 inside main body 302 may be configured to be engaged by projection 398 (FIG. 14B) of insert 380.

Main body 302 may have a first socket 530A and a second socket 530B (see FIG. 15A). First socket 530A may be formed between first side 506 of first wall 502 and the inner surface of first sidewall 314 of main body 302. Second socket 530B may be formed between first side 516 of second wall 504 and the inner surface of second sidewall 316 of main body 302. As discussed above, cover plate 320 may include a first locking tab 324A and a second locking tab 324B. First socket 530A may be configured to receive first locking tab 324A of cover plate 320 and second socket 530B may be configured to receive second locking tab 324B of cover plate 320 to removably secure cover plate 320 to main body (see FIG. 8A). To disassociate cover plate 320 from main body 302, latch 325A and latch 325B may be generally simultaneously depressed at relief slot 318A and relief slot 318B, respectively, and pull tab 326 may be used to pull cover plate 320 out of main body 302.

FIGS. 11A through 11E illustrate example operation of system 300 in sequence, according to one example of the embodiments. The sequence depicted in FIGS. 11A through 11E is only meant to be illustrative, and is not intended to be independently limiting.

FIG. 11A shows the main body 302 in cross-section, with fastener 340 (see FIG. 9A) movably secured within main body 302 as discussed above. In FIG. 11A, each of the shank 360, the cover plate 320, and the gas turbine component 400 are not associated with main body 302.

Figure 11B:
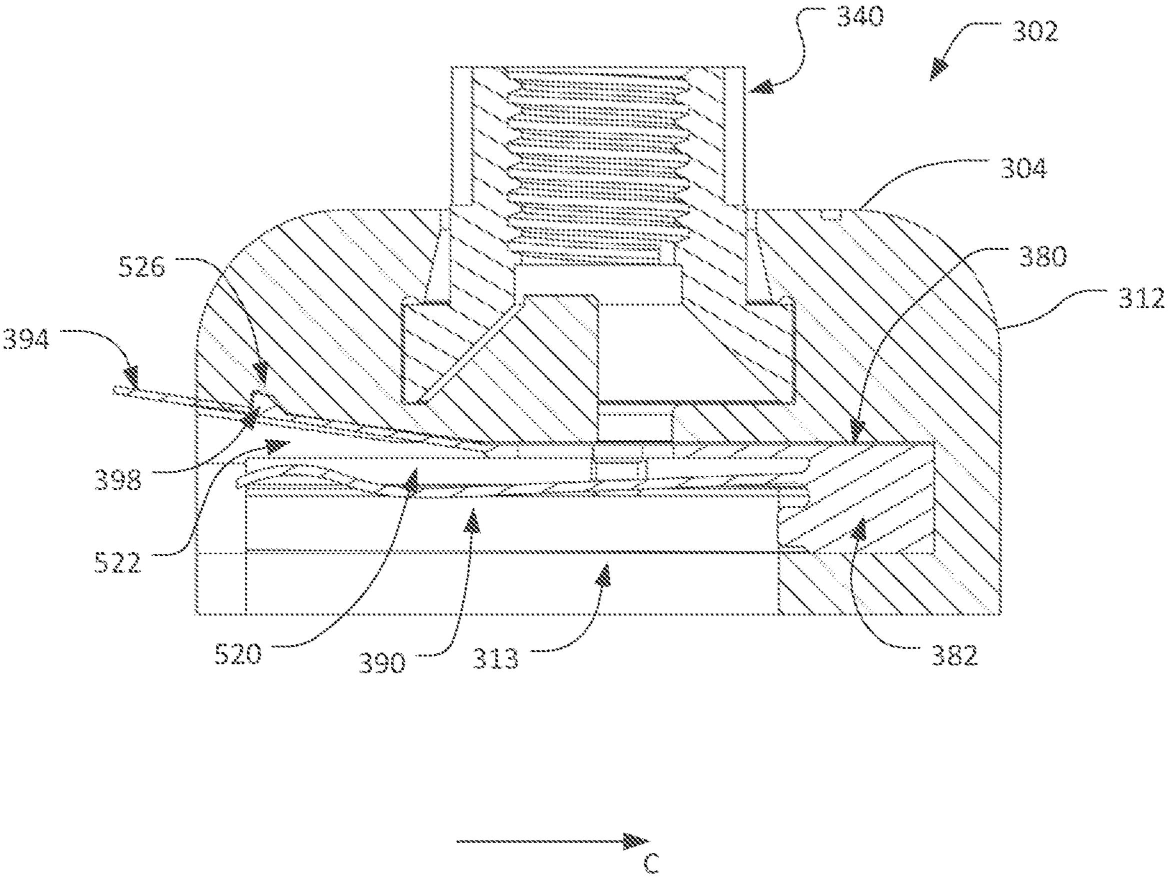
Figure 15B:
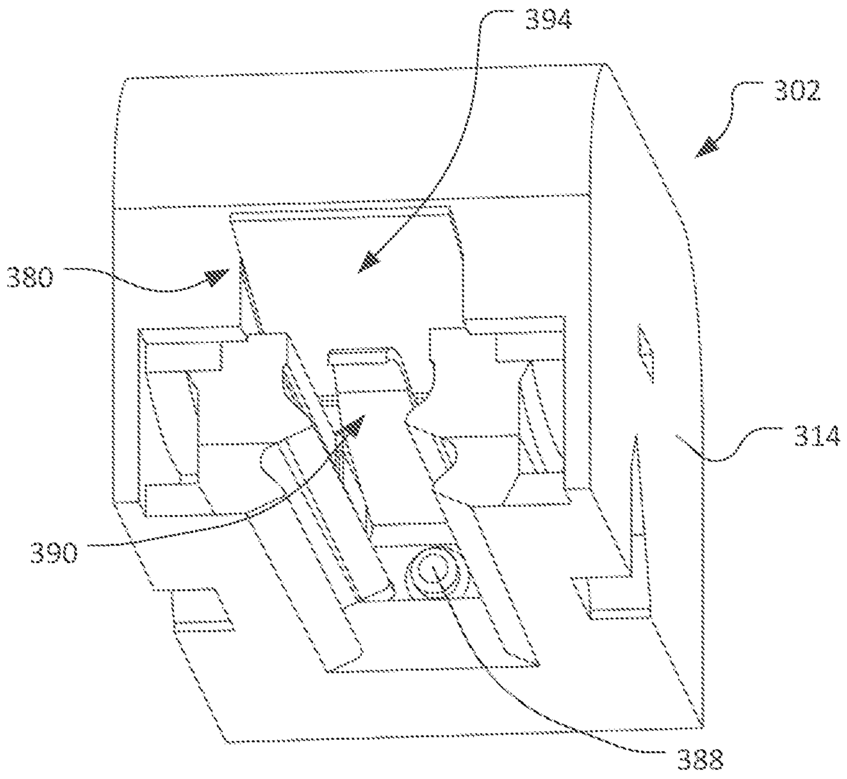

FIG. 11B and FIG. 15B illustrate insert 380 (see FIG. 9A) after it has been inserted into main body 302, and specifically, into channel 520 (see FIG. 11A) thereof. In particular, insert 380 may be inserted in direction C inside channel 520 and may be press fit into channel 520 such that support 382 (see FIG. 14A) is seated within second section 524 (see FIG. 11A) of channel 520, and the flat spring 390 and stop 394 are received within first section 522 of channel 520. As discussed, tangs 510A of first wall 502 within main body 302 may be configured to mate with serrations 386A (FIG. 14A) of insert 380, and tangs 510B of second wall 504 within main body 302 may be configured to mate with serrations 386B (FIG. 9B) of insert 380. As can be seen in FIG. 11B, when insert 380 is inserted within channel 520, projection 398 of stop 394 of insert 380 may engage notch 526 (see FIG. 11A) inside main body 302. Engagement of stop 394 of insert 380 with notch 526 inside main body 302 may preclude insert 380 from unintentionally coming out of channel 520.

Figure 11C:
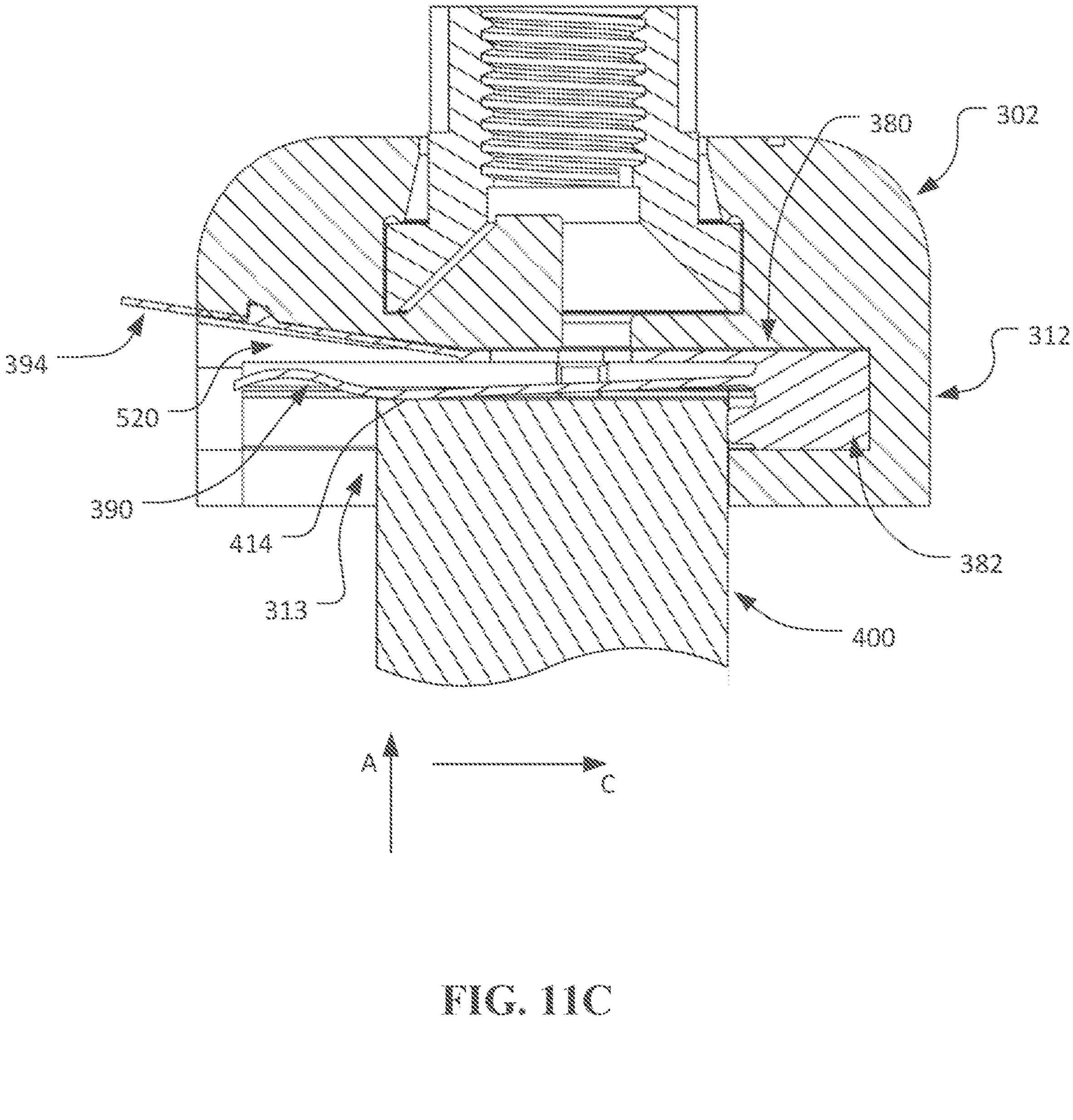

Once the insert 380 has been inserted in channel 520 as illustrated in FIG. 11B, gas turbine component 400 may be inserted in direction C into retention slot 313 and secured within retention slot 313 as illustrated in FIG. 11C.

Figure 15C:
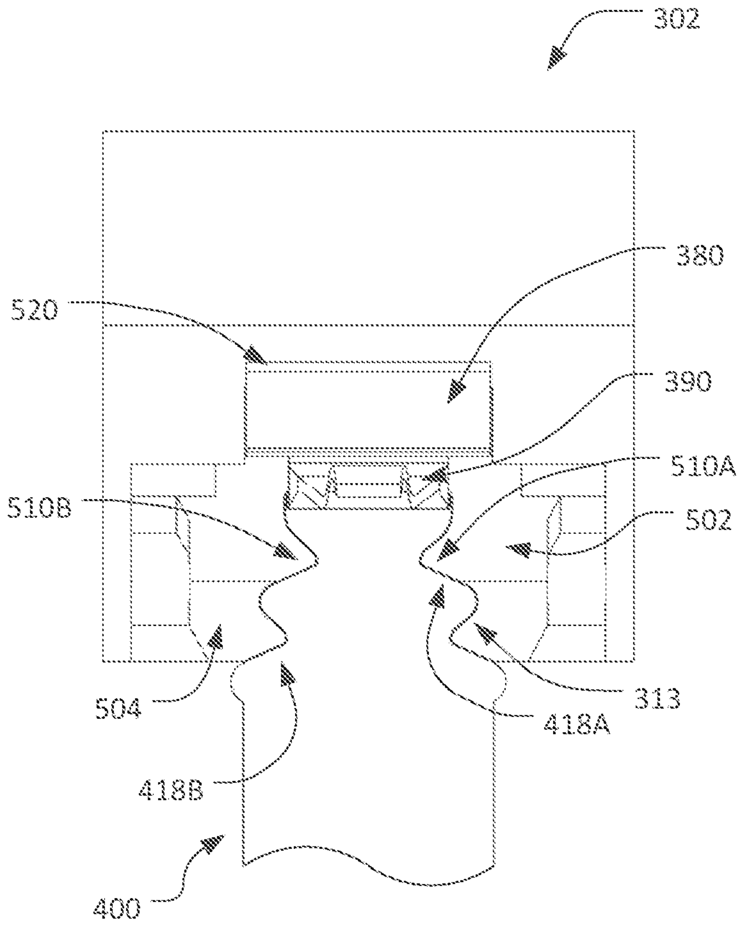
FIG. 15C is a schematic illustrating a gas turbine component retained within the main body of the system of FIGS. 8A-8B, according to some aspects of the disclosure.

FIG. 15C schematically illustrates main body 302 after insert 380 has been received within channel 520 (FIG. 15A) of main body 302, and gas turbine component 400 has been inserted into and secured within retention slot 313 of main body 302. As discussed above, tangs 510A (see FIG. 15A) of first wall 502 inside main body 302 may be configured to mate with tangs 418A (FIG. 9A) of dovetail 412 of gas turbine component 400, and tangs 510B (see FIG. 15A) of second wall 504 inside main body 302 may be configured to mate with tangs 418B (FIG. 9B) of dovetail 412 of gas turbine component 400. The gas turbine component 400 may be pushed within retention slot 313 until end 416B (see FIG. 9B) of dovetail 412 abuts protrusion 388 (see FIG. 15B) of insert 380. The abutment of end 416B of dovetail 412 with protrusion 388 of insert 380 may preclude gas turbine component 400 from being pushed further into retention slot 313 in direction C.

As the gas turbine component 400 is being inserted in direction C into retention slot 313, the bottom wall 414 (see FIG. 9A) of gas turbine component 400 may contact flat spring of insert 380 and exert a force thereupon in direction A (see FIG. 11C). That is, bottom wall 414 of gas turbine component 400 may contact and push flat spring 390 of insert 380 upwards within channel 520 as gas turbine component 400 is inserted in direction C into retention slot 313. The flat spring 390 may therefore be held under tension by gas turbine component 400 as the gas turbine component 400 is secured within retention slot 313.

Figure 11D:
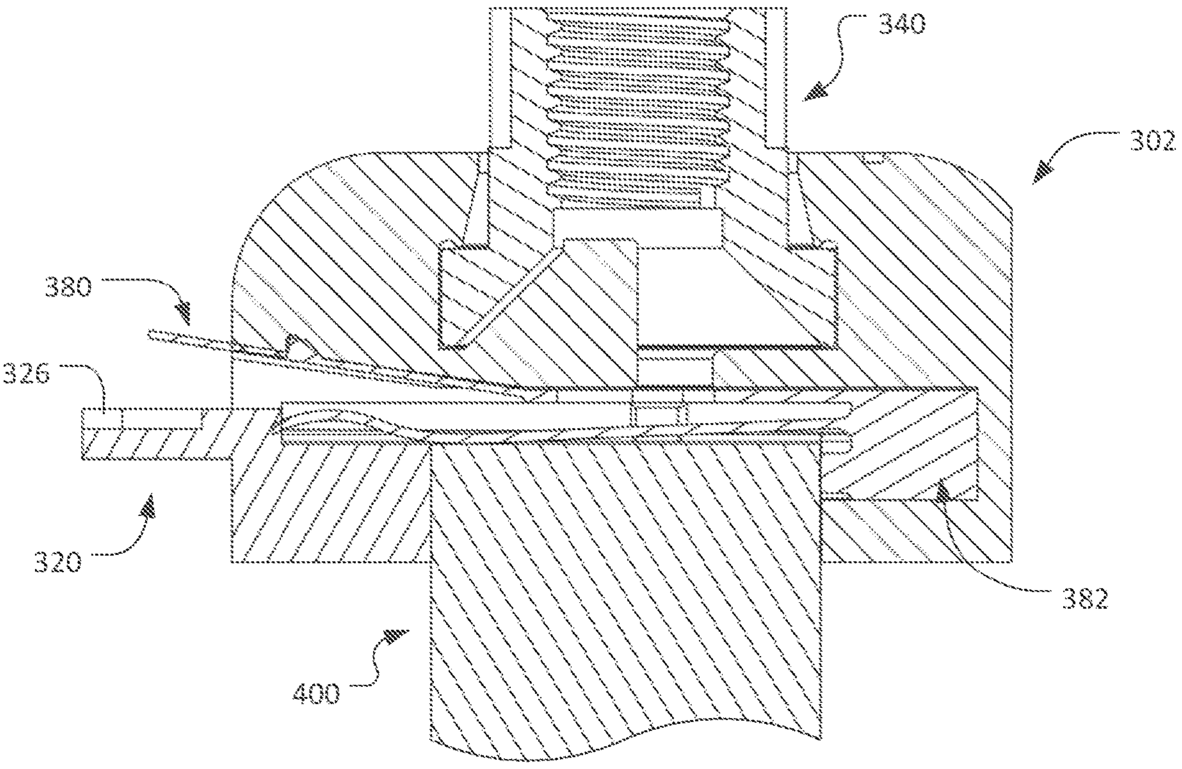

Once insert 380 has been inserted in channel 520 and gas turbine component 400 has been inserted in retention slot 313, cover plate 320 may be removably coupled to main body 302. Specifically, first locking tab 324A (FIG. 9A) of cover plate 320 may be received within first socket 530A (FIG. 15A) of main body 302 and second locking tab 324B (FIG. 9B) of cover plate 320 may be received within second socket 530B (FIG. 15A) of main body 302. Latch 325A of first locking tab 324A may engage relief slot 318A (FIG. 9A) in main body 302 and latch 325B of second locking tab 324B may engage relief slot 318B (FIG. 9B) in main body 302. The cover plate 320 may be removably secured to main body 302 in this manner, as illustrated in FIG. 8A. FIG. 11D illustrates a cross section of main body 302 with cover plate 320 removably coupled thereto (after the insert 380 and gas turbine component 400 have been inserted within main body 302 as illustrated in FIG. 11C).

Figure 10:
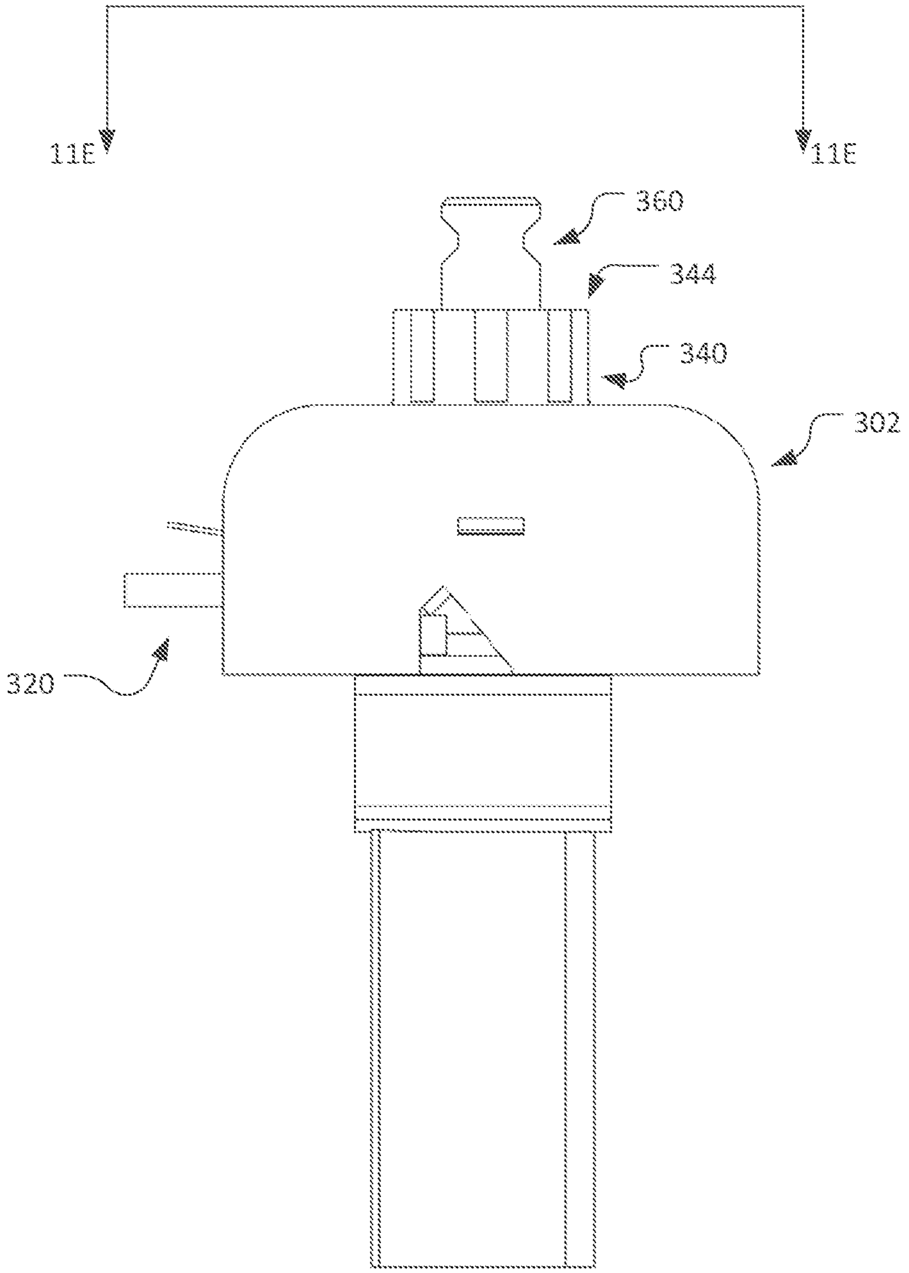
FIG. 10 is a side view of the system of FIGS. 8A-8B, according to some aspects of the disclosure.
Figure 11E:
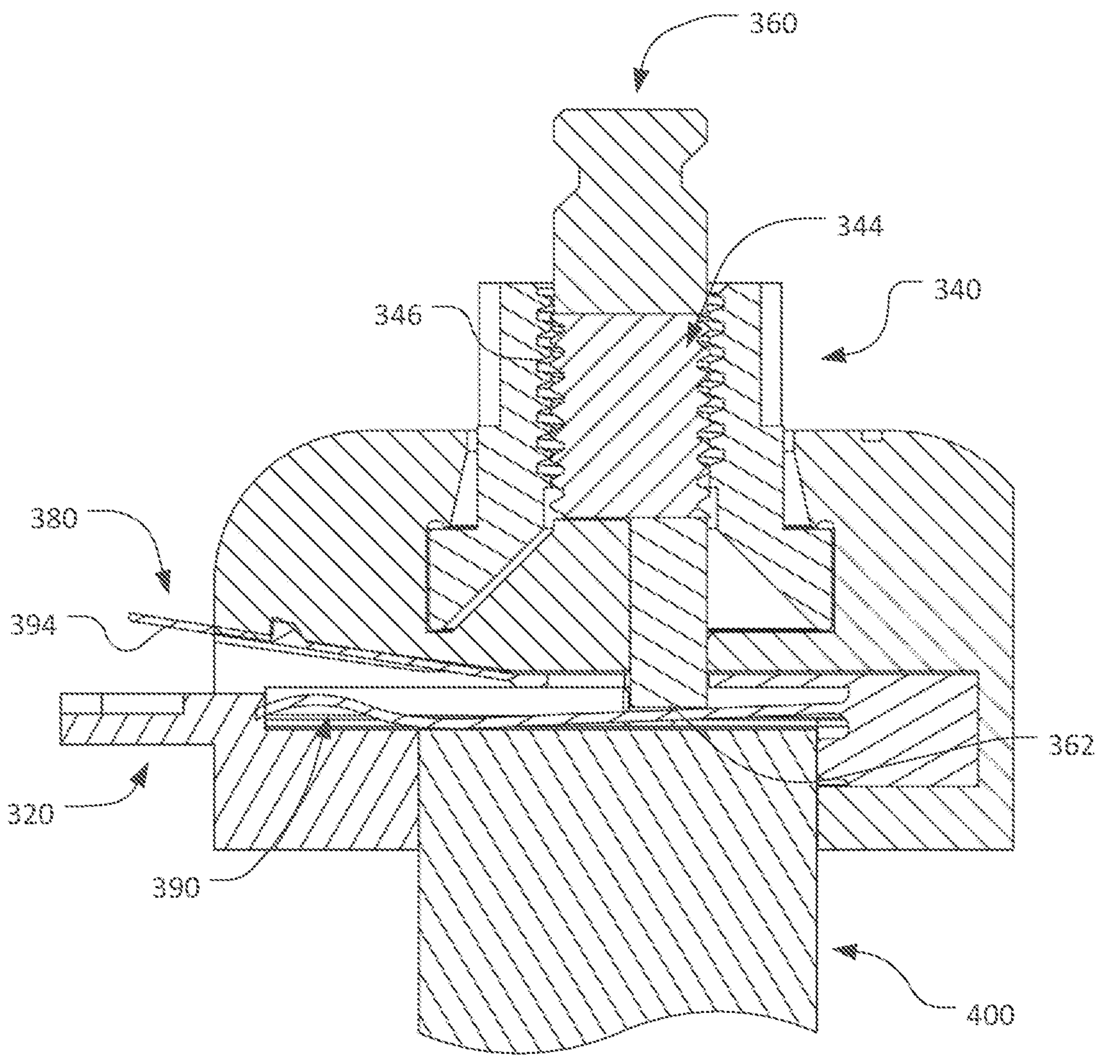

Once the cover plate 320 has been removably secured to main body 302, shank 360, and specifically, first end 362 (see FIG. 13) thereof, may be inserted within internal opening 344 (see FIG. 13) of fastener 340 (see FIG. 11E and FIG. 10). Threaded area 366 (see FIG. 13) on outer surface of shank 360 may be threadingly mated with internal threads 346 (see FIG. 12A) inside internal opening 344 of fastener 340. Shank 360 may be rotated to cause first end 362 of shank 360 to continue to move in a downward direction further inside main body 302. First end 362 may eventually pass through aperture 397 (see FIG. 14A) in stop 394 of insert 380 and contact upper surface of flat spring 390 of insert 380. Lower surface of flat spring 390 may in-turn be in contact with bottom wall 414 of gas turbine component 400. Flat spring 390 may therefore be in contact with each of shank 360 and gas turbine component 400, and may be pushed by gas turbine component 400 into shank 360.

Once the insert 380, gas turbine component 400, and cover plate 320 are inserted into main body 302 as discussed herein, and the shank 360 contacts flat spring 390 which in-turn contacts gas turbine component 400, gas turbine component 400 may be ready to be electroplated. As discussed with respect to system 100 and gas turbine component 200, portions of gas turbine component 400 (such as dovetail 412 and bottom wall 414) may be masked by system 300 and other portions of gas turbine component 400 (such as airfoil 406 and at least a portion of blade shank 410) may be exposed. Exposed portions of gas turbine component 400 may therefore be electroplated while gas turbine component 400 is retained within main body 302 and at least a portion of gas turbine component 400 is masked by main body 302.

As embodied by the disclosure, gas turbine component 400 may be electroplated by lowering at least a portion of gas turbine component 400 (such as airfoil 406) into an electrolytic solution. Shank 360 may be in direct contact with insert 380, such as flat spring 390 thereof, and flat spring 390 may be in direct contact with gas turbine component 400, such as bottom wall 414 thereof. Shank 360 and insert 380 may each be fabricated from conductive material, such as titanium. System 300 and gas turbine component 400 retained therein may act as the cathode. An anode, generally a metal that will form the plating, may also be lowered into the solution. A source of electric current may be electrically coupled to the cathode (such as shank 360) and the anode. The current may cause the anode to oxidize and metal atoms may dissolve in the electrolytic solution as positive ions. The current may cause the positive metal ions to move towards the cathode and deposit onto the exposed portions of gas turbine component 400.

In some examples, and as discussed above with respect to system 100 and illustrated in FIGS. 6A-6B, a plurality of gas turbine components 400 may be electroplated at the same time. For example, a plurality of systems 300, each with a gas turbine component 400 retained in the retention slot 313 thereof, may be coupled to a support bar through respective mounting fixtures, such as support bar 600 and mounting fixtures 602 shown in FIG. 6A. The support bar 600 and mounting fixture 602 may be fabricated from a conductive material and may be maintained in physical contact with shank 360. The support bar 600 may allow the gas turbine component 400 coupled to each mounting fixture 602 to be simultaneously lowered into the electrolytic solution. Electric current may be supplied to each mounting fixture 602, and thereby to each gas turbine component 400 via shank 360. Each gas turbine component 400 may be selectively electroplated at generally the same time. As discussed with respect to system 100, additional maskants (such as an ultraviolet cured maskant) may be applied to the gas turbine component 400 after it secured within main body 302 and before gas turbine component 400 is electroplated.

System 300 may be fabricated through a variety of processes and from a variety of materials. In some examples of the embodiments, one or more of main body 302, cover plate 320, and fastener 340 of system 300 may be manufactured and assembled using conventional machining and assembly techniques. In other examples of the embodiments, one or more of main body 302, cover plate 320, and fastener 340 of system 300 may be additively manufactured. There are several known additive printing methods such as a material extrusion method, a material jetting method, a binder jetting method, a sheet lamination method, a vat photo-polymerization method, a powder bed fusion method, a directed energy deposition (DED) method, et cetera. Any one or more of these methods, or any other additive manufacturing method, now known or hereinafter developed, may be employed to manufacture one or more of main body 302, cover plate 320, and fastener 340.

In some examples, each of the main body 302, cover plate 320 and fastener 340 may be additively manufactured together from a rigid polymer material having suitable strength to retain gas engine component 400 and a softening temperature above about 360K. One such acceptable material is Acrylonitrile Butadiene Styrene (ABS). Another such acceptable material is Acrylonitrile Styrene Acrylate (ASA). Other suitable materials may also be used to fabricate, such as using additive manufacturing, one or more of main body 302, cover plate 320, and fastener 340. As described above, shank 360 and insert 380 may be fabricated, e.g., additively manufactured, from one or more conductive materials, such as titanium, stainless steel, aluminum, or other metals or metal alloys.

As discussed above for system 100 and gas turbine component 200, electroplating of the gas turbine component 400 in the electrolytic solution may cause the electrolytic solution to reach extremely high temperatures, such as a temperature of about 373K or more. The electrolytic solution may continuously evaporate at this temperature and the resultant steam may contact the system 300, including main body 302 thereof. This high-temperature steam may cause main body 302, which may be made of polymer, to expand. Expansion of main body 302 may cause retention slot 313 to also expand, and consequently, gas turbine component 400 may move in a downward direction within the retention slot 113. The shank 360, however, may be threadingly coupled to fastener 340, and as such, may not move with the gas turbine component 400. Without the insert 380, this relative motion between shank 360 and gas turbine component 400 may sever the electrical contact between first end 362 of shank and bottom wall 414 of gas turbine component 400. The insert 380, and particularly the flat spring 390 thereof, may ensure that electrical contact between shank 360 and gas turbine component 400 is maintained notwithstanding expansion of main body 302 that causes gas turbine component 400 to move relative to shank 360. Physical contact between end 416B of dovetail 412 and protrusion 388 of insert 380 may further reduce the likelihood of loss of electrical contact between shank 360 and gas turbine component 400.

Figure 16A:
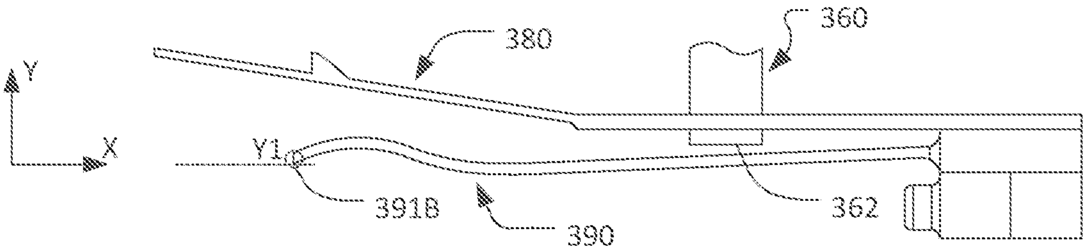
FIGS. 16A-16C are schematics illustrating example operation of an insert of the system of FIGS. 8A-8B, according to some aspects of the disclosure.
Figure 16B:
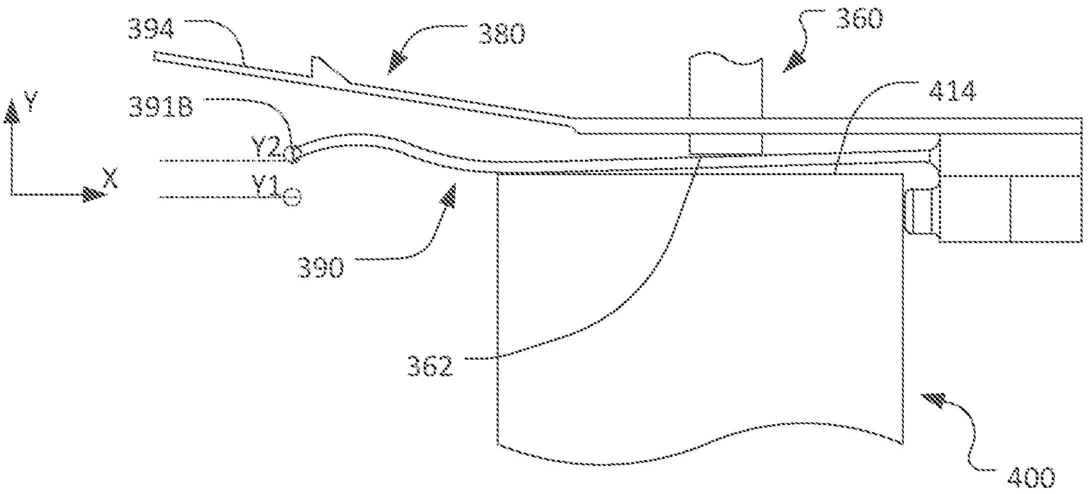
Figure 16C:
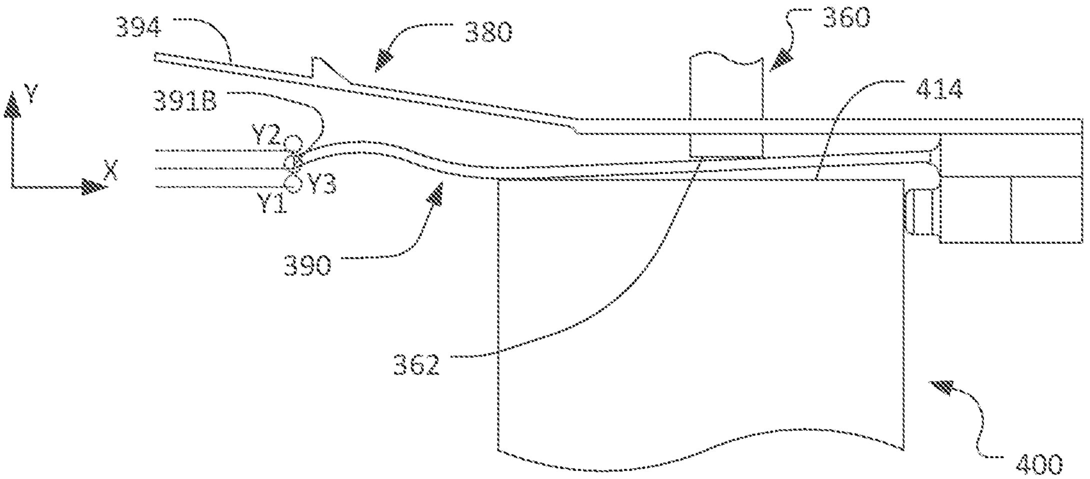

Focus is directed to FIGS. 16A-16C, which schematically illustrate example operation of insert 380 to maintain electrical contact between shank 360 and bottom wall 414 of gas turbine component 400 (gas turbine component 400 is not shown in FIG. 16A for clarity). An X-Y axis is included in each of these figures for ease of understanding.

FIG. 16A illustrates flat spring 390 of insert 380 in its steady state, where no force is being applied thereto. In the steady state, the second end 391B of flat spring 390 is at coordinate Y1 along the Y-axis. When second end 391B of flat spring 390 is at coordinate Y1, the flat spring 390 may be spaced apart from shank 360, and particularly, from the first end 362 thereof.

FIG. 16B illustrates flat spring 390 after gas turbine component 400 has been inserted in retention slot 313 (not shown in FIG. 16B for clarity). As the gas turbine component 400 is inserted into retention slot 313 (see FIG. 11C), gas turbine component 400 may exert an upward force on the flat spring 390 and cause the second end 391B to be displaced from coordinate Y1 to coordinate Y2. Coordinate Y2 may be greater (i.e., higher) than coordinate Y1. The flat spring 390 may be held in tension by gas turbine component 400 and may now be in contact with each of bottom wall 414 of gas turbine component 400 and first end 362 of shank 360.

FIG. 16C illustrates flat spring 390 after gas turbine component 400 has been displaced relative to shank 360. As described, such may occur because of expansion of main body 302 (not shown in FIG. 16C for ease of illustration). Expansion of main body 302 may cause gas turbine component 400 to move in a generally downward direction. Flat spring 390 may consequently move downwards with bottom wall 414 of gas turbine component 400 along the Y-axis towards the steady state (coordinate Y1) of flat spring 390. For example, as illustrated in FIG. 16C, second end 391B of flat spring 390 may reach coordinate Y3 which may be smaller than coordinate Y2 and greater than or equal to coordinate Y1. The flat spring 390 may thereby maintain physical contact with each of first end 362 of shank 360 and bottom wall 414 of gas turbine component 400, and electrical contact between shank 360 and gas turbine component 400 may be maintained notwithstanding relative movement of gas turbine component 400 and shank 360.

Various other gas turbine engine components, such as turbine vanes, shroud duct segments, or other components may also be fixtured utilizing the present disclosure. While the system 300 is illustrated with reference to gas turbine component 400, system 300 may likewise be used to retain other components undergoing an electroplating process, such as a rim of a vehicle tire or another suitable component. Moreover, while the system 300 is illustrated in connection with gas turbine component 400 undergoing an electroplating process, the system 300 may likewise be used to secure a component undergoing any suitable electrically-driven process, such as immersion plating or another electrically-driven process now known or subsequently developed. The system 300 may be reusable to fixture a plurality of components undergoing one or more electrically-driven processes.

Although a preferred embodiment of this disclosure has been provided, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects herein-above set forth together with other advantages which are obvious, and which are inherent to the structure.

It will be understood that certain features and subcombinations are of utility and may be employed without reference to other features and subcombinations. This is contemplated by and is within the scope of the claims.

What is claimed is:

1. A system for securing a component for an electrically-driven process, comprising:

a main body having an opening, a retention slot configured for retaining the component, and a channel;

a fastener extending through the opening in the main body;

an insert inserted into the channel; and a shank movably coupled to the fastener and configured to contact the insert;

wherein, the insert is configured to maintain electrical contact between the shank and the component when the component is retained within the retention slot.

2. The system of claim 1, wherein the insert includes a flat spring.

3. The system of claim 2, wherein the component displaces the flat spring from its steady state when the component is inserted into the retention slot.

4. The system of claim 1, wherein the insert includes a support having a protrusion configured to contact the component when the component is retained within the retention slot.

5. The system of claim 1, including a cover plate having a locking tab.

6. The system of claim 5, wherein the main body includes a socket for receiving the locking tab.

7. The system of claim 6, wherein the main body has a relief slot and the locking tab has a catch configured to extend through the relief slot.

8. The system of claim 1, wherein at least one of the main body and the fastener is additively manufactured from a polymer material.

9. The system of claim 1, wherein the insert is additively manufactured from a conductive material.

10. The system of claim 1, wherein the shank extends through an aperture in the insert.

11. The system of claim 1, wherein at least a section of the channel is above the retention slot.

12. The system of claim 1, wherein the component is one of a gas turbine blade and a gas turbine vane.

13. The system of claim 1, wherein the insert is configured to maintain electrical contact between the shank and the component when the component is retained within the retention slot and the component moves relative to the shank during the electrically-driven process.

14. The system of claim 1, wherein the insert includes a support having a serration configured to matingly contact a feature of the component.

15. The system of claim 1, wherein the insert includes a stop having a projection, and the main body includes a notch configured to receive the projection.

16. The system of claim 2, wherein the flat spring includes a curved portion configured as a gripping surface for manipulating the insert.

17. The system of claim 1, wherein the main body includes a wall within the channel, the wall having a tang configured to matingly receive a serration of the insert.

18. The system of claim 1, wherein the system is configured to mask at least a portion of the component during the electrically-driven process.

19. The system of claim 1, wherein the insert is removable from the main body.

20. The system of claim 9, wherein the conductive material includes at least one of titanium, stainless steel, and tungsten carbide.

* * * * *